United States Patent
Arabaci et al.

(10) Patent No.: US 9,838,138 B1
(45) Date of Patent: Dec. 5, 2017

(54) SELF-CALIBRATION OF PLUGGABLE OPTICAL MODULE

(71) Applicant: Juniper Networks, Inc., Sunyvale, CA (US)

(72) Inventors: Murat Arabaci, San Jose, CA (US); Marianna Pepe, San Jose, CA (US); Massimiliano Salsi, San Jose, CA (US); Philip A. Thomas, San Jose, CA (US); David James Ofelt, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/984,837

(22) Filed: Dec. 30, 2015

(51) Int. Cl.
*H04B 10/588* (2013.01)

(52) U.S. Cl.
CPC .................................. *H04B 10/588* (2013.01)

(58) Field of Classification Search
CPC ... H04B 10/58–10/588; H04B 10/0799; H04B 10/5057
See application file for complete search history.

(56) References Cited

U.S. PATENT DOCUMENTS

| | | | | |
|---|---|---|---|---|
| 7,668,512 | B2* | 2/2010 | Woolf | H04B 10/43 398/16 |
| 9,178,610 | B1* | 11/2015 | Chan | H04B 10/035 |
| 2013/0308953 | A1* | 11/2013 | Hopkins | H04B 10/2507 398/115 |
| 2014/0334828 | A1* | 11/2014 | Yu | H04B 10/073 398/140 |

OTHER PUBLICATIONS

Coersmeier et al., "Comparison Between Different Adaptive Pre-Equalization Approaches for Wireless LAN," The 13th IEEE International Symposium on Personal, Indoor and Radio Communications, Sep. 15-18, 2002, 5 pp.

Gan, "Adaptive Digital Predistortion of Nonlinear Systems," Ph.D. Dissertation, Graz University of Technology, Graz, Austria, Apr. 2009, 130 pp.

"Coherent Optical Signal Generation With High-Performance AWG, App. Note 76W-29051-1," Tektronix, retrieved from http://www.tek.com/document/application-note/coherent-optical-signal-generation-high-performance-awg, Jan. 2014, 38 pp.

Zhou et al., "64-Tbp/s 8b/s/Hz PDM-36QAM Transmission Over 320km Using Both Pre-and Post-Transmission DSP," IEEE JLT, vol. 29, No. 4, Feb. 15, 2011, pp. 571-577, Nov. 14, 2016.

(Continued)

*Primary Examiner* — David Payne
*Assistant Examiner* — Casey Kretzer
(74) *Attorney, Agent, or Firm* — Shumaker & Sieffert, P.A.

(57) ABSTRACT

Techniques are described for determining pre-compensation parameters to compensate for signal integrity degradation along a signal path. A processor generates a first digital signal and receives a second digital signal. The second digital signal is generated from an optical-to-electrical conversion of a feedback optical signal that is generated from an electrical-to-optical conversion of an electrical signal by an optical module. The processor determines the pre-compensation parameters based on the first and second digital signals.

21 Claims, 8 Drawing Sheets

(56) References Cited

OTHER PUBLICATIONS

Napoli et al., "Novel DAC Digital Pre-Emphasis Algorithm for Next-Generation Flexible Optical Transponders," Optical Fiber Communication Conference and Exhibition (OFC), Mar. 22-26, 2015, 3 pp.

Ljung, "System Identification: Theory for the User," University of Linkoeping, Sweden, P T R Prentice Hall, Englewood Cliffs, New Jersey, 1987, 255 pp. ("Applicant points out, in accordance with MPEP 609.4(a), that the year of publication, 1987, is sufficiently earlier than the effective U.S. filing date, Dec. 30, 2015, so that the particular month of publication is not in issue.").

Haykin, "Least Mean-Square Adaptive Filters," Adaptive Filter Theory, Pearson, 4th Ed., 2002. p. 231-311. ("Applicant points out, in accordance with MPEP 609.04(a), that the year of publication, 2002, is sufficiently earlier than the effective U.S. filing date, Dec. 30, 2015, so that the particular month of publication is not in issue.").

Gardner, "A BPSK/QPSK Timing-Error Detector for Sampled Receivers," IEEE Transactions on Communications, vol. COM-34, No. 5, May 1986, pp. 423-429.

* cited by examiner

SELF-CALIBRATION OF PLUGGABLE OPTICAL MODULE

TECHNICAL FIELD

This disclosure relates to optical communication, and more particularly, to coherent optical communication system.

BACKGROUND

With the increase in the amount of data that needs to be communicated, optical communication systems need to evolve to operate at higher data rates. For instance, some recent optical communication systems operate in the 100 gigabits per second (Gbps) range. Scaling to these types of high data rate optical communication systems present design challenges for maintaining signal integrity not only due to the higher bandwidth, but also due to the complex modulation formats.

SUMMARY

In general, this disclosure describes techniques to enable self-calibration of a pluggable optical module to pre-compensate for signal integrity degradation along a signal path from a processor of the electronic device through the pluggable optical module and to the output of the pluggable optical module. For example, the pluggable optical module receives an electrical signal from a processor and, in response, outputs an optical signal. In addition to the electrical characteristics of the processor (e.g., analog bandwidth of components), traces, and connectors that interconnect the processor to the pluggable optical module, as well as the components within the pluggable optical module, impact signal integrity such that the outputted optical signal deviates from the signal generated by the processor. Because different pluggable optical modules have different characteristics, the impact on signal integrity may be different for different pluggable optical modules.

In techniques described in this disclosure, the processor of the electronic device, such as a wavelength division multiplexing (DWDM) line-card, switch, router or other device such as a chassis housing any of these devices, determines the impact on the signal integrity (e.g., as transfer function) from the various components between the processor and the pluggable optical module, including the processor itself and the components within the pluggable optical module. The processor determines equalization parameters for an equalizer of the electronic device based on the determined impact on the signal integrity. Based on the equalization parameters, the equalizer may then apply pre-compensation while generating an electrical signal so that after this electrical signal traverses the path degrading signal integrity, the pre-compensation effects and signal degradations over the signal path balance each other and the optical output signal presents a more precise representation of the desired signal. The desired signal can be a close representation of the electrical signal generated by the processor based on some cost function or a different target signal satisfying some other criteria. In some cases, because the pluggable optical modules may be hot-pluggable, the processor may perform these example techniques while a device that hosts the processor is in operation (e.g., perform the example techniques in the field during operation).

In one example, the disclosure describes a method for optical communication, the method comprising outputting, with a processor of an electronic device, a first electrical signal generated from a first digital signal to an optical module coupled to the electronic device, receiving, with one or more analog-to-digital converters (ADCs), a second electrical signal from the optical module, the second electrical signal generated from an optical-to-electrical conversion of a feedback optical signal that is generated from an electrical-to-optical conversion of the first electrical signal by the optical module, and converting, with the one or more ADCs, the second electrical signal into a second digital signal. The first digital signal and the second digital signal are different due to signal integrity degradation along a signal path of the first digital signal through the optical module. The method also includes determining, with the processor of the electronic device, pre-compensation parameters based on the first digital signal and the second digital signal, and applying, with the processor of the electronic device, pre-compensation, based on the pre-compensation parameters, to a data signal to compensate for the signal integrity degradation along the signal path.

In one example, the disclosure describes a processor for a line card used in optical communication, the processor comprising transmit circuitry configured to output a first electrical signal generated from a first digital signal to an optical module, and receive circuitry configured to receive a second electrical signal from the optical module, the second electrical signal generated from an optical-to-electrical conversion of a feedback optical signal that is generated from an electrical-to-optical conversion of the first electrical signal received by the optical module, and convert the second electrical signal into a second digital signal. The first digital signal and the second digital signal are different due to signal integrity degradation along a signal path of the first digital signal through the optical module. The processor also includes processing circuitry configured to determine pre-compensation parameters based on the first digital signal and the second digital signal, and a transmit equalizer configured to apply pre-compensation, based on the pre-compensation parameters, to a data signal to compensate for the signal integrity degradation along the signal path.

In another example, the disclosure describes an electronic device for optical communication, the electronic device comprising a pluggable interface for a pluggable optical module. The pluggable interface is configured to removably couple the pluggable optical module to the electronic device. The electronic device includes a processor configured to output a first electrical signal to the pluggable optical module through the pluggable interface, and one or more analog-to-digital converters (ADCs) configured to receive a second electrical signal from the pluggable optical module, the second electrical signal generated from an optical-to-electrical conversion of a feedback optical signal that is generated from an electrical-to-optical conversion of the first electrical signal received by the pluggable optical module, and convert the second electrical signal into a second digital signal. The first digital signal and the second digital signal are different due to signal integrity degradation along a signal path of the first digital signal through the pluggable optical module. The processor is further configured to determine pre-compensation parameters based on the first digital signal and the second digital signal, and apply pre-compensation, based on the pre-compensation parameters, to a data signal to compensate for the signal integrity degradation along the signal path.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
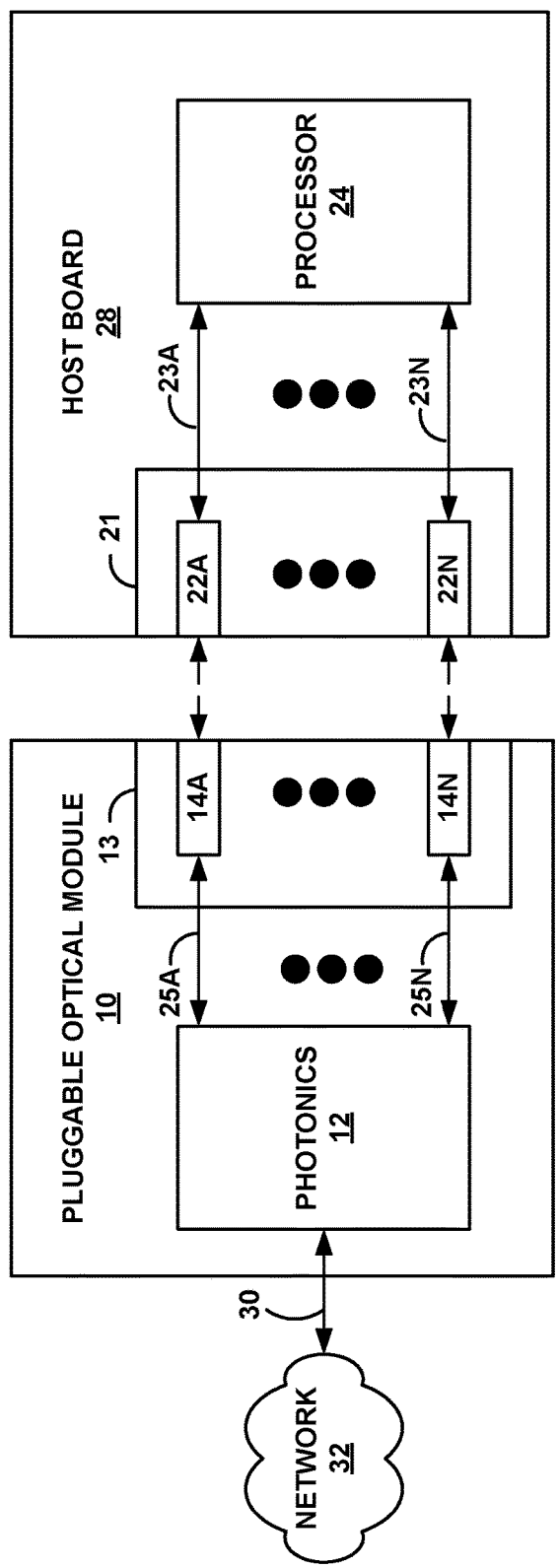
FIG. 1 is a block diagram illustrating a pluggable optical module coupled to a host board in accordance with one or more examples described in this disclosure.

FIG. 1 is a block diagram illustrating pluggable optical module 10 coupled to host board 28 in accordance with one or more examples described in this disclosure. The combination of pluggable optical module 10 and host board 28 represents a network device or a portion thereof. Host board 28 is referred to as a host board in that it "hosts" pluggable optical module 10. That is host board 28 typically includes an electrical interface for receiving and mating with an electrical interface of pluggable optical module 10. Pluggable optical module 10 may be a removable front end module that may be physically received by and removed from host board 28 operating as a back end module within a communication system or device. In other words, pluggable optical module 10 may be removably coupled to the electronic device (e.g., host board 28). Pluggable optical module 10 and host board 28 typically are components of an optical communication device or system (e.g., a network device) such as a wavelength-division multiplexing (WDM) system, including a dense wavelength division multiplexing (DWDM) system. For example, a WDM system may include a plurality of slots reserved for a plurality of boards, such as host board 28. Host board 28 is an example of a line card used in WDM systems. Each host board 28 may receive one or more removable "pluggable" photonics module 10 to provide optical connectivity for one or more optical links 30. However, aspects of this disclosure are not limited to WDM systems. For purposes of illustration only and for ease of description, the examples are described in context of a WDM system.

In a WDM system, an electronic device may be a chassis that may house various types of devices such as routers, servers, and the like, and may include host board 28. Host board 28 or another board connected to host board 28 receives a plurality of lower data rate optical or electrical signals from multiple devices such as switches or routers that host board 28 or the other board serializes together into higher data rate electrical signals. Pluggable optical module 10 converts the electrical signals to an optical signal for further transmission into network 32 via optical link 30. Examples of network 32 include, but are not limited to, a wide area network (WAN).

In the reverse, pluggable optical module 10 receives higher data rate optical signals via optical link 30 from network 32, and converts the optical signals to electrical signals. Host board 28 receives the electrical signals from pluggable optical module 10, and host board 28 or the other board deserializes the electrical signals into a plurality of lower data rate optical or electrical signals for transmission to the routers and switches.

As the amount of data that needs to be transmitted to and received from network 32 increases, the data rate at which host board 28 needs to forward to and from the routers and switches or the number of parallel lanes between the host board 28 and the routers or switches increases. For example, as routers and switches are being designed to receive and transmit data at ever higher data rates, the WDM systems need to scale to the higher data rates to keep pace with data rates from the routers and switches. For instance, it may have been sufficient for host board 28 and pluggable optical module 10 to operate at approximately 10 Gbps, but now need to operate at 100 Gbps and beyond.

Scaling from 10 Gbps to 100 Gbps and beyond presents several design and cost challenges. For example, 10 Gbps data rate is sufficiently slow to allow simple modulation schemes such as on-off keying (OOK), sometimes referred to as non-return-to-zero (NRZ) modulation. In OOK modulation, the presence of a carrier wave for a specific duration represents a binary one, and its absence for the same duration represents a binary zero. However, OOK modulation may not be suitable at 100+ Gbps, and more complex modulation schemes may be necessary. For example, hardware components may not be able to process OOK modulated data at the relatively high rate of 100 Gbps.

In some examples, 100 Gbps may require phase-shift keying (PSK) such as quadrature phase-shift keying (QPSK), as one example, although other modulation schemes are possible such as binary phase-shift keying (BPSK), polarization-multiplexed BPSK (PM-BPSK, polarization-multiplexed QPSK (PM-QPSK), M-ary quadrature amplitude modulation (M-QAM), or PM-M-QAM, where M≥4. For purposes of illustration, the example techniques are described with respect to QPSK modulation, and in particular PM-QPSK modulation. However, aspects of this disclosure should not be considered so limiting. The techniques described in this disclosure are extendable to other modulation schemes such as those used for coherent optical communication systems. For instance, BPSK, PM-BPSK, QPSK, PM-QPSK, M-QAM, and PM-M-QAM modulation schemes may each require coherent optical detection, and pluggable optical module 10 and host board 28 may be considered as being part of a coherent optical communication system.

Coherent optical communication systems refer to optical systems that utilize both magnitude and phase information for transmitting and receiving data such as for phase-shift keying or quadrature amplitude modulation (e.g., BPSK, PM-BPSK, QPSK, PM-QPSK, M-QAM, or PM-M-QAM modulation). For example, as illustrated in more detail with respect to FIGS. 2A and 2B, photonics 12 of pluggable optical module 10 may include lasers and phase and amplitude modulating optical hardware to mix pairs of data streams received from host board 28 for transmission as a single optical signal. Photonics 12 may also include the optical hybrid mixers to convert the received optical signal into the pairs (e.g., in-phase and quadrature) of data streams, referred to as I and Q data streams, for transmission to host board 28.

In QAM modulation, binary ones and zeros are represented by changing, or modulating, both the magnitude and the phase of a carrier wave sometimes referred to as a lightwave. In this manner, both the magnitude and the phase of the optical signal are used to transmit data. For example, both the magnitude and the phase information of the received optical signal may be needed to recover the transmitted data.

In some examples, in addition, the modulated lightwave in one polarization may be multiplexed with another modulated lightwave in another polarization, which may be orthogonal to the previous one, to produce a polarization-multiplexed (PM) signal, such as PM-M-QAM, an example of which is PM-QPSK where M=4. The polarizations of the lightwave signals may be chosen to be orthogonal to allow for a simple polarization beam splitter or polarizer to be used for polarization demultiplexing when photonics 12 receives data from network 32.

In this way, PM-QPSK may be considered as a combination of two QPSK lightwave signals, where a first QPSK lightwave signal is for a first polarization of the lightwave, and the second QPSK lightwave signal is for a second polarization of the lightwave. Each of the QPSK lightwave signals utilizes four phases to encode two bits per symbol. Accordingly, PM-QPSK modulation utilizes four phases to encode two bits per symbol per polarization, which results in four bits per symbol.

For example, PM-QPSK modulation uses two input electrical data streams per polarization to impart the complex information on the optical carrier. The electrical signal for each polarization contains a pair of in-phase (I) and quadrature (Q) data streams that represent the complex data waveform. For example, in PM-QPSK modulation, there may be two in-phase data streams and two quadrature data streams, and one I data stream and one Q data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential. For OOK modulation, a single data stream is sufficient to impart the data on the lightwave, and similarly, a single data stream is sufficient to recover the data after detection by a photo-detector.

In other words, in PM-QPSK modulation, the input optical signal includes two lightwaves that are polarized orthogonally with respect to one another (e.g., one is horizontally polarized light, and the other is vertically polarized light, as an illustrative example). However, the polarization need not always be horizontally and vertically polarized light. For ease of description, one of the lightwaves may be referred to as lightwave with polarization X (e.g., horizontal polarization), and the other as lightwave with polarization Y (e.g., vertical polarization). Each of the lightwaves may be associated with a particular magnitude and phase. The magnitude and phase of each of the lightwaves may be represented as a complex signal that includes real and imaginary aspects (the terms real and imaginary are used to distinguish the signals, and not to imply that "imaginary" portion is not present).

For example, processor 24 of host board 28 outputs an in-phase electrical signal for polarization X, referred to as XI, and a quadrature electrical signal for polarization X, referred to as XQ, and outputs an in-phase electrical signal for polarization Y, referred to as YI, and a quadrature electrical signal for polarization Y, referred to as YQ. The magnitude and phase of the optical signal having polarization X is based on the value of XI and XQ, and the magnitude and phase of the optical signal having polarization Y is based on the value of YI and YQ.

This relative increase in modulation complexity (e.g., from OOK modulation to QAM modulation) and signaling rate present a design challenge for scaling a WDM system. For example, additional care may need to be taken to maintain signal integrity because of the high data rate and the complex modulation. For instance, because PM-QPSK modulation results in a plurality of data streams (e.g., two pairs of I and Q data streams), with each pair representing both magnitude and phase information of the lightwave signal, care may need to be taken to ensure that the signal integrity for the pairs of data streams is maintained to properly recover both the magnitude and phase information of the received optical signal.

The techniques described in this disclosure provide for a scheme to allow the photonics for a relatively higher data rate WDM system (e.g., a 100 Gbps WDM system) to reside in a pluggable module, such as pluggable optical module 10, rather than on host board 28. In this manner, photonics functions such as mixing of optical I and Q data stream pairs for PM-QPSK occur within pluggable optical module 10, and other functions such as ADC, DAC and digital signal processing (DSP) functions occur on a different board such as host board 28 or another board coupled to host board 28 that is further downstream, rather than both functions occurring on a common board.

However, the techniques described in this disclosure can also be used when both functions are performed on a common board (e.g., host board with processor and on-board optics). For example, rather than being pluggable, an optical module including components similar to those of pluggable optical module 10 may be hardwired to host board 28 that includes processor 24. When the optical module is hardwired to host board, the optical module need not be separately housed or otherwise detachable. The term "optical module" is therefore used to refer to the components that provide electrical-to-optical conversion for transmission and optical-to-electrical conversion for reception. For purposes of illustration, this disclosure describes pluggable optical module 10, but the techniques are not limited to only pluggable optical modules.

The pluggable design of pluggable optical module 10 allows the owner to defer photonics costs. For example, the owner may pre-populate the 100 Gbps WDM system with a plurality of boards such as host board 28 for eventual upgrade to 100 Gbps. The cost of host board 28 may be substantially less than the cost of the photonics needed for 100 Gbps. Then, when 100 Gbps data rates are needed, the owner purchases a plurality of pluggable modules such as pluggable optical module 10 and plugs each of these modules into respective ones of host board 28. In this manner, pluggable optical module 10 provides the owner with a "pay as you grow" market strategy by differing costs associated with the 100 Gbps photonics until the growth requires it.

Also, using pluggable optical module 10 provides the owner with vendor options. For example, one vendor may provide a better 100 Gbps version of pluggable optical module 10 compared to another vendor, and the pluggable design of pluggable optical module 10 allows the owner to select the better 100 Gbps version of pluggable optical module 10. Moreover, the owner may not know ahead of time whether there will be further advances in photonics technology, or whether the 100 Gbps WDM system will be needed for special use cases. With the pluggable design, the owner may have flexibility to upgrade to better versions of pluggable optical module 10, as well as flexibility to select the photonics module needed for the special use cases.

While the pluggable feature of pluggable optical module 10 is beneficial for the above reasons, there may be certain challenges. For example, the electrical and optical characteristics of different types of pluggable optical module 10 may be different. In this disclosure, electrical and optical characteristics refer to the impact on signal integrity by a particular component (e.g., pluggable optical module 10). For instance, the characteristics might define how much change have occurred between an input signal and an output signal. Mathematically, the characteristics can be considered as the transfer function such that in the frequency domain, the input signal multiplied by the transfer function results in the output signal. In the time domain, the output signal equals a convolution of the input signal with the impulse response of the transfer function.

As an example, assume that the optical output of pluggable optical module 10 is fed back to the optical input of pluggable optical module 10. In this example, if pluggable optical module 10 has no impact on the signal integrity of the electrical signal that pluggable optical module 10 receives, then the electrical output signal leaving the pluggable optical module 10 in the reverse direction would be the same as the electrical signal inputted to pluggable optical module 10. However, more likely, pluggable optical module 10 would impact the signal integrity such that the electrical output signal is different than the electrical input signal in this feedback configuration. As described in more detail, the example techniques described in this disclosure provide a mechanism by which processor 24 is able to determine, during operation, the characteristics of pluggable optical module 10, as well as the signal path from processor 24 (including the processor 24 itself) through pluggable optical module 10, so that processor 24 can pre-compensate for the impact of those characteristics on the signal integrity.

Because vendors use different components and different designs, the electrical and optical characteristics of pluggable optical module 10 may change based on the vendor. The electrical and optical characteristics of pluggable module 10 may impact the signal integrity of the electrical signal that processor 24 outputs. Also, because pluggable optical module 10 is "hot-pluggable" (e.g., pluggable after the device that houses host board 28 is operational), the exact type of pluggable optical module 10 may not be known ahead of time. Therefore, even if the electrical and optical characteristics of one type of pluggable optical module 10 were compensated for, the compensation may not be applicable for another type of pluggable optical module 10 or the compensation might result in sub-optimal performance. Furthermore, not only do the electrical and optical characteristics of pluggable optical module 10 impact the signal integrity, but the electrical characteristics of the traces that the XI, XQ, YI, and YQ signals need to traverse may impact the signal integrity as well.

As illustrated, host board 28 includes pluggable interface 21 (e.g., an electrical and physical interface) and pluggable optical module 10 includes pluggable interface 13 (e.g., an electrical and physical interface), which mates with pluggable interface 21. Pluggable interface 13 and pluggable interface 21 mate with one another to couple pluggable optical module 10 to host board 28. With pluggable interface 13 and pluggable interface 21, pluggable optical module 10 can be selectively coupled to or decoupled from host board 28. For example, pluggable interface 21 is configured to removably couple pluggable optical module 10 to host board 28 or the device that houses host board 28.

Pluggable interface 13 includes connection points 14A-14N (collectively referred to as "connection points 14") and pluggable interface 21 includes connection points 22A-22N (collectively referred to as "connection points 22"). When pluggable optical module 10 couples to host board 28, connection points 14 mate with corresponding connection points 22 to provide a continuous electrical path for data transmission and reception between pluggable optical module 10 and host board 28.

For example, photonics 12 of pluggable optical module 10 receives a downstream optical signal from network 32 via optical link 30. In this example, the downstream optical signal is modulated in accordance with the PM-QAM (e.g., PM-QPSK) modulation scheme. Photonics 12 converts the downstream optical signal into two pairs of I and Q optical data streams, and converts the two pairs of I and Q optical data streams to two pairs of I and Q electrical data streams (referred to as pairs of I/Q electrical data streams for ease of reference). In this example, the pairs of I/Q electrical data streams together represent magnitude and phase information for the received signal. Photonics 12 transmits the pairs of I/Q electrical data streams to host board 28 via the electrical path provided by the mating of connection points 14 to connection points 22.

Processor 24 receives the I/Q electrical data streams via traces 23A-23N where each trace may be a differential or single-ended transmission line. Traces 23A-23N are collectively referred to as "traces 23." For example, host board 28 includes eight pairs of traces 23, assuming differential signals, for sixteen total traces. Eight traces 23 would be used for single ended, but the disclosure is described with respect to differential signals.

Four pairs of traces 23 are for processor 24 to receive the electrical signals (e.g., a pair of transmission lines for XI, one pair of transmission lines for XQ, one pair of transmission lines for YI, and one pair of transmission lines for YQ). In the upstream, processor 24 transmits the pairs of I/Q electrical data streams to photonics 12 via traces 23 (e.g., the remaining four traces of the eight pairs of traces) and the electrical path provided by the mating of connection points 22 to connection points 14. Photonics 12 receives the pairs of I/Q electrical data streams, and converts the pairs of I/Q electrical data streams into a single optical signal for upstream transmission to network 32 via optical link 30.

While pluggable optical module 10 may provide cost deferment and design flexibility, the pluggable design may degrade the signal integrity of the pairs of I/Q electrical data streams received or transmitted by host board 28. For example, the mating of connection points 14 to connection points 22 may result in a less than ideal connection between pluggable optical module 10 and host board 28, referred to as physical impairments of mating connection points 14 to connection points 22. For instance, connection points 14 and connection points 22 may not line up perfectly. Furthermore, even when connection points 14 and connection points 22 line up as close to ideal as possible, the connection between connection points 14 and connection points 22 may increase insertion loss that the signal experiences, as compared to the case where the components of pluggable optical module 10 were directly coupled to the components of host board 28 (i.e., the components of pluggable optical module 10 resided on host board 28 or the processor was consumed within the pluggable module). The connection between connection points 14 and connection points 22 (i.e., the pluggable interfaces), may also induce additional signal integrity challenges such as crosstalk and return loss, that may be addressed by meticulous board design practices; however, insertion loss remains as an intrinsic challenge.

These physical impairments negatively impact the signal integrity of the pairs of I/Q electrical data streams. For example, the physical impairments distort the pairs of I/Q electrical data streams transmitted by photonics 12. They may distort both the amplitude of the pairs of the I/Q electrical data streams as a function of frequency and the phase of the pairs of the I/Q electrical data streams as a function of frequency (e.g., group delay as a function of frequency). In examples where photonics module 10 is not pluggable, but instead hardwired directly on host board 28, the signal integrity impairments from the various connections may be reduced. However, there may still be other causes that impair signal integrity including the signal integrity impairments caused by limitations of the components (e.g., bandwidth, skew, etc. of the components). As noted above, although the techniques are described with respect to pluggable optical module 10, the techniques are not limited to examples where the optical module is pluggable, and applicable to examples where the optical module is hardwired with host board 28 that includes processor 24.

Similar to the physical impairments of connection points 14 and connection points 22, traces 23 also contribute to impact on the signal integrity. For example, the way in which traces 23 are laid out on host board 28 affects the signal integrity, the quality of the material of traces 23 affects the signal integrity, and the like. In addition, the interconnection with the chip die of processor 24 and the pad of processor 24, and the solder connection between the pad of processor 24 and footprint on host board 28 also affect the signal integrity.

In this disclosure, the term "signal path" is used to encapsulate the various components from the chip die of processor 24 through the interconnection points 14, 22 and to the output of the pluggable optical module 10. As an example, traces 23 may be buried in host board 28, and therefore, in this example, there are vias on host board 28 from the output of processor 24 to traces 23 and vias from traces 23 to connection points 22. Connection points 22 may mate with connection points 14 through a connector. From connection points 14 to photonics 12 there may be another set of traces 25A-25N (collectively referred to as "traces 25"). Within photonics 12 or on traces 25, there may be a plurality of AC-coupling capacitors (one for each one of traces 25) that block the DC component from reaching the drivers within photonics 12. The drivers within photonics 12 drive the components of photonics 12. Within photonics 12, there also exist opto-electrical components that impact the signal integrity while producing the output optical signal. In this disclosure, the signal path includes all of these various components and structures that the signals generated by processor 24 need to traverse to form the desired output optical signal.

As described in more detail below, processor 24 includes an equalizer (TX-pre-compensation unit) in the transmit circuitry which can be dynamically configured to compensate for the signal path impact. For example, processor 24 may be configured to determine a transfer function of the signal path to determine pre-compensation parameters for the TX-pre-compensation unit, and configure the TX-pre-compensation unit to apply pre-compensation based on the determined pre-compensation parameters. In this way, TX-pre-compensation unit may modify the electrical signal generated by processor 24 before the electrical signal is outputted via traces 23.

For example, the optical output of pluggable optical module 10 can more closely represent the desired output signal when pre-compensation is applied compared to the case that no pre-compensation is applied by the TX-pre-compensation unit. Without the pre-compensation, the optical output of pluggable optical module 10 may produce a signal modified by the characteristics of the signal path rather than the desired output signal. The TX-pre-compensation unit pre-compensates the electrical signals generated by processor 24 such that at the end of the signal path, including pluggable optical module 10, the output is a close representation of the desired signal with minimum to no impact of the signal path on the signal integrity. The optical signal that pluggable optical module 10 outputs to network 32 may therefore be a high-fidelity signal as compared to the case where the signal integrity impact is not compensated for.

Processor 24 may determine the pre-compensation parameters of the TX-pre-compensation unit during a calibration phase. For example, after pluggable optical module 10 is inserted into host board 28, processor 24 may initiate a calibration process. During the calibration process, processor 24 determines the characteristics of the signal path (e.g., transfer function of the signal path) in accordance with the examples described in this disclosure. Processor 24 then determines the pre-compensation parameters of the TX-pre-compensation unit based on the determined transfer function. In this example, processor 24 may be considered as performing a self-calibration to determine the pre-compensation parameters of the TX-pre-compensation unit after pluggable optical module 10 is inserted into host board 28, which might occur while the device that houses host board 28 is in operation. For instance, processor 24 characterizes the opto-electrical channel (i.e., signal path) that the signals traverse and determines the correct pre-compensation parameters (e.g., correct equalization settings).

Although the above calibration example is described when pluggable optical module 10 is first inserted, the example techniques are not so limited. Processor 24 may initiate calibration in response to a user or programmed request, automatically following insertion of a new pluggable optical module, routinely at preset intervals, or any combination.

Examples of processor 24 include, but are not limited to, a digital signal processor (DSP), a general purpose microprocessor, an application specific integrated circuit (ASIC), a field programmable logic array (FPGA), a combination thereof, or other equivalent integrated or discrete logic circuitry. In some examples, processor 24 may include other components for processing purposes such as ADCs and DACs, as further described below. Furthermore, although the one or more equalizers (e.g., TX-pre-compensation unit) are described as being internal to processor 24, aspects of this disclosure are not so limited. These one or more equalizers may be external to processor 24. Accordingly, host board 28 may be considered as including the one or more equalizers.

According to example implementations of the techniques described in this disclosure, to perform the calibration, processor 24 outputs a first electrical signal (e.g., XI, XQ, YI, and YQ) generated from a first digital signal (e.g., dXI, dXQ, dYI, and dYQ digital signals) to pluggable optical module 10. One or more analog-to-digital converters (ADCs), which may be part of processor 24 or external to processor 24, receives a second electrical signal from pluggable optical module 10. This second electrical signal is generated from an optical-to-electrical conversion of a feedback optical signal that is generated from an electrical-to-optical conversion of the first electrical signal received by pluggable optical module 10. The second electrical signal is then digitalized by the ADCs to generate a second digital signal (e.g., the ADCs convert the second electrical signal into a second digital signal). The first electrical signal and the second electrical signal and the first digital signal and the second digital signal tend to be different due to signal integrity degradation along the signal path (e.g., from processor 24 through traces 23 and through pluggable optical module 10).

For example, pluggable optical module 10 may include an optical switch that couples the optical output from photonics 12 to optical link 30. However, during calibration, the optical switch couples the optical output of photonics 12 back to the optical input of photonics 12. In this way, pluggable optical module 10 performs electrical-to-optical conversion of the first electrical signal that processor 24 outputs, and feeds the optical output signal back to the optical input for optical-to-electrical conversion to generate the second electrical signal. In some examples, rather than utilizing an internal switch, a user may manually couple the optical output of pluggable optical module 10 to the optical input of pluggable optical module 10.

Processor 24 determines pre-compensation parameters for the TX-pre-compensation unit based on the first digital signal and the second digital signal. As an example, processor 24 determines a transfer function based on the second digital signal and the first digital signal, the transfer function representing a ratio between the second digital signal and the first digital signal in the frequency domain. Processor 24 determines pre-compensation parameters based on the determined transfer function.

The TX-pre-compensation unit may then apply pre-compensation on data signals outputted by processor 24 to pre-compensate for the signal integrity degradation along the signal path of the data signal. In some examples, during the calibration (e.g., when processor 24 outputs the first electrical signal), processor 24 may turn off TX-pre-compensation unit or cause TX-pre-compensation unit to provide a fixed amount of equalization that processor 24 can account for when determining the pre-compensation parameters (e.g., de-embed the pre-compensation that TX-pre-compensation unit applied to the first electrical signal during calibration).

The first electrical signal that processor 24 outputs during calibration may be a pre-selected electrical signal. In some examples, the first electrical signal may be generated by processor 24 as a periodic signal since secondary noise sources (e.g., spectral estimation errors) may not be present for a periodic signal. Therefore, in this example, the transfer function indicates the characteristics of the signal path and excludes effects of secondary noise sources.

In the above example, the first electrical signal may include the XI, XQ data streams and the YI, YQ data streams so that processor 24 performs the calibrations using all four data streams of PM-QAM modulation scheme. However, the techniques are not so limited. In some examples, processor 24 may output only one of the data stream pairs (e.g., XI, XQ or YI, YQ) and determine the pre-compensation parameters using only one of the data stream pairs, and applying the pre-compensation parameters to the other data stream pair. Utilizing all four data streams may result in more optimized calibration results for all signal paths as compared to using only two data streams especially in cases where signal paths may vary significantly.

Figure 2A:
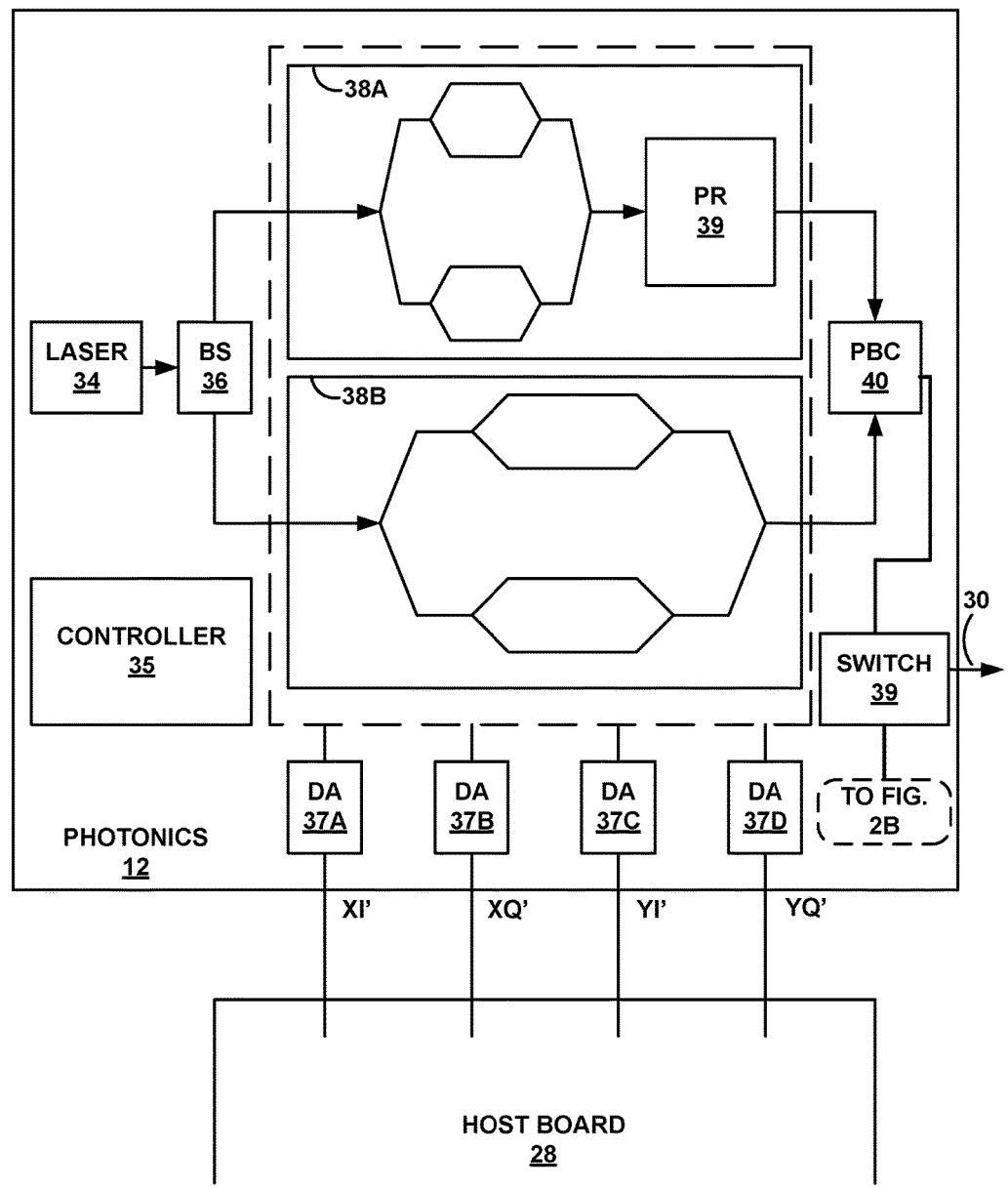
FIGS. 2A and 2B are block diagrams illustrating examples of photonics within a pluggable optical module.
Figure 2B:
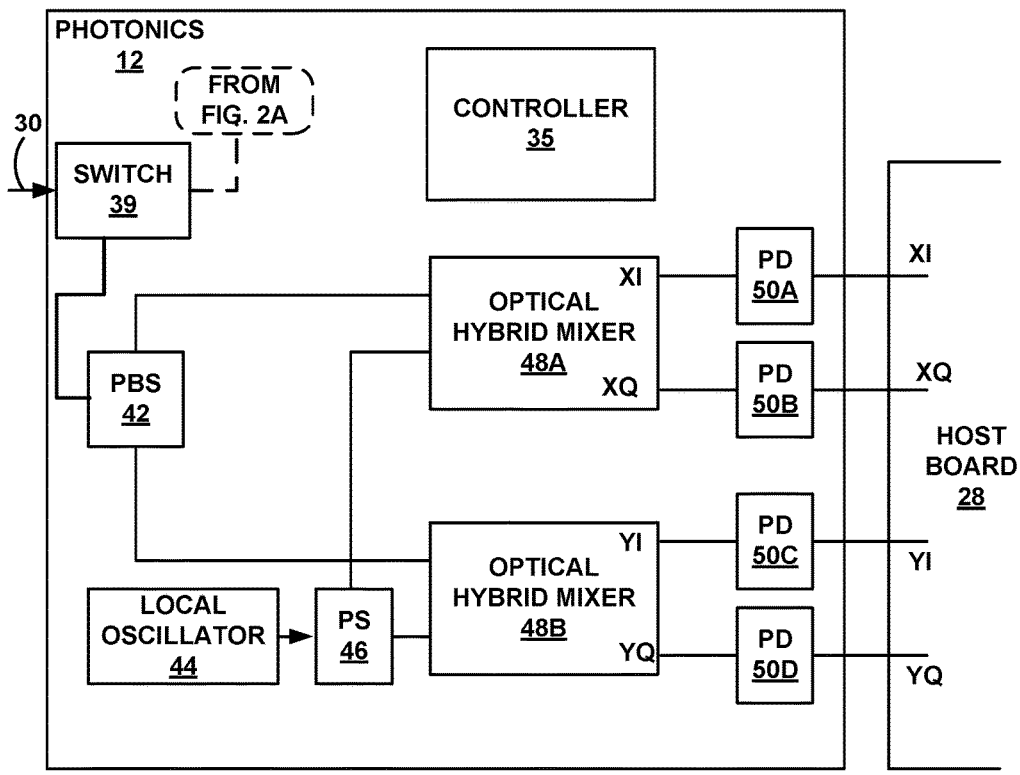

FIGS. 2A and 2B are block diagrams illustrating examples of photonics within a pluggable optical module. For example, FIG. 2A illustrates components of photonics 12 that receive I/Q electrical data streams from processor 24, convert the I/Q electrical data streams into a QAM modulated optical signal or PM-QAM modulated optical signal, and transmit the optical signal to network 32. FIG. 2B illustrates components of photonics 12 that receive a QAM or PM-QAM optical signal from network 32, convert the optical signal into I/Q electrical data streams, and transmit the I/Q electrical data streams to processor 24. FIGS. 2A and 2B are illustrated separately for ease of description. However, it should be understood that photonics 12 includes both the transmit photonics illustrated in FIG. 2A and the receive photonics illustrated in FIG. 2B.

Furthermore, the components of photonics 12 are illustrated for PM-QAM modulation. Photonics 12 may include additional, fewer, or different components than those illustrated here without limiting the applicability of this disclosure. In alternate examples, photonics 12 might include different configurations to achieve PM-QAM modulation.

As illustrated in FIG. 2A, the transmit photonics of photonics 12 include laser 34, controller 35, beam splitter (BS) 36, drive amplifiers 37A-37D, optical modulators 38A and 38B, and polarization beam combiner (PBC) 40. Optical modulator 38A may also include polarization rotator (PR) 39, or PR 39 may be external to optical modulator 38A and coupled to the output of optical modulator 38A. PR 39 may be part of optical modulator 38B, or external to optical modulator 38B and coupled to the output of optical modulator 38B in other examples. PR 39 rotates the polarization of the optical signal generated by optical modulator 38A by 90°, and rotates the polarization of the optical signal generated by optical modulator 38B by 90° in examples where PR 39 is coupled to or part of optical modulator 38B.

PBC 40 is coupled to optical link 30 and outputs an optical modulated signal (e.g., a PM-QAM modulated optical signal). Also, as illustrated, photonics 12 receives XI', XQ', YI', and YQ' data streams, which are electrical data streams outputted by processor 24 on host board 28 for modulation.

In this disclosure, the terms XI', XQ', YI', and YQ' electrical data streams are used to describe data streams that processor 24 transmits to pluggable optical module 10 (e.g., the first electrical signal), and the terms XI, XQ, YI, and YQ electrical data streams are used to describe data streams that processor 24 receives from pluggable optical module 10 (e.g., the second electrical signal). Furthermore, the terms dXI', dXQ', dYI', and dYQ' digital data streams correspond to electrical data streams XI', XQ', YI', and YQ', respectively, through digital-to-analog conversion process by DACs. Similarly, the terms dXI, dXQ, dYI, and dYQ digital data streams correspond to electrical data streams XI, XQ, YI, and YQ, respectively, through analog-to-digital conversion process by ADCs.

The dXI', dXQ', dYI', and dYQ' data streams that processor 24 transmits may be different from the dXI, dXQ, dYI, and dYQ data streams that processor 24 receives. For example, the dXI', dXQ', dYI', and dYQ' data streams are for downstream communication, while the dXI, dXQ, dYI, and dYQ data streams are for upstream communication. Also, during calibration, dXI', dXQ', dYI', and dYQ' data stream and dXI, dXQ, dYI, and dYQ data streams may be different mainly due to signal integrity degradation along the signal path including pluggable optical module 10.

In FIG. 2A, the XI' and XQ' data streams form a first pair of data streams that processor 24 transmits, and may be for the lightwave with polarization X. The YI' and YQ' data streams may form a second pair of data streams that processor 24 transmits, and may be for the lightwave with polarization Y. In some examples, the XI', XQ', YI', and YQ' data streams may be composed of differential data streams that are AC coupled via capacitors to photonics 12. The AC-coupling capacitors form part of the signal path and may contribute to the degradation of the electrical signal.

In FIG. 2A, the components of photonics 12 receive the XI', XQ', YI', and YQ' data streams from connection points 14, which mates with connection points 22 of host board 28. Photonics 12 include drive amplifiers 37A-37D coupled to each one of the XI', XQ', YI', and YQ' data streams. Drive amplifiers 37A-37D may amplify the voltage level of the XI', XQ', YI', and YQ' data streams outputted by host board 28.

Laser 34 may be any type of laser that is usable for high bit rate optical signal transmission, typically a low linewidth laser in the 1550 nm wavelength range (so-called C-Band), but can be tuned to any wavelength. Optical amplifiers operating in the same wavelength range may allow photonics 12 to transmit the generated optical signal a relatively far distance. An example is Erbium-Doped Fiber Amplifiers (EDFAs), which amplify light in the 1550 nm spectral region. The ability of photonics 12 to transmit the generated optical signal a relatively far distance reduces the number of intermittent optical-to-electrical-to-optical (O-E-O) repeaters needed to regenerate the transmitted optical signal.

Beam splitter (BS) 36 receives the light from laser 34 and splits the light into (at least) two paths. Each one of optical modulators 38A and 38B receives light from one of the paths. Optical modulators 38A and 38B modulate the light on the respective paths with respective I/Q electrical data stream pairs. Optical modulators 38A and 38B may be referred to as IQ modulators or Cartesian modulators. In the example of FIG. 2A, optical modulator 38A receives the XI' and XQ' electrical data streams and modulates the light to form a complex modulated lightwave signal, modulated in both magnitude and phase, forming a QAM signal. Optical modulator 38B receives YI' and YQ' electrical data streams and modulates the light to form a complex modulated lightwave signal, modulated in both magnitude and phase, forming a second QAM signal.

Polarization beam combiner (PBC) 40 receives the polarized and modulated optical signals from each one of optical modulator 38A and 38B. For instance, the optical QAM signals from optical modulators 38A or 38B are then multiplexed in (nominally orthogonal) polarization using PBC 40. For example, PBC 40 combines the received QAM optical signals into nominally orthogonal polarizations into a single polarization multiplexed (PM) optical signal and transmits the PM-QAM optical signal to network 32 via optical link 30. In this manner, photonics 12 utilizes lightwave communications techniques to generate and transmit an optical PM-QAM signal.

As illustrated in FIG. 2B, the receive photonics of photonics 12 include polarization beam splitter (PBS) 42, local oscillator (LO) 44, polarization splitter (PS) 46, optical hybrid mixers 48A and 48B, and photo-detectors (PDs) 50A-50D. PDs 50A-50D convert the optical signal to an electrical representation. PBS 42 receives an optical signal from network 32 via optical link 30 and splits the received optical signal into first and second optical signals with nominally orthogonal polarization (e.g., substantially orthogonal polarization). Each one of optical hybrid mixers 48A and 48B receive respective optical signals from the first and second nominally orthogonal optical signals from PBS 42.

The receive photonics also include local oscillator 44, which is a laser. Local oscillator 44 provides the reference required in a coherent system to recover the information imprinted in the waveform that photonics 12 receives. In some examples, local oscillator 44 may be a free running oscillator. For example, the laser signal outputted by local oscillator 44 may not need to be phase-locked with the optical signal that PBS 42 receives.

Polarization splitter (PS) 46 receives the light from local oscillator 44 and splits the light into (at least) first and second light paths. Each one of optical hybrid mixers 48A and 48B receive respective local oscillator light from the first and second light paths from the PS 46. In some examples, the location of PBS 42 and PS 46 may be swapped with no loss of functionality, provided the light from local oscillator 44 is split into two nominally orthogonally polarized lightwaves.

Optical hybrid mixers 48A and 48B each mix the respective optical signals from PBS 42 with the respective local oscillator lightwave reference from PS 46 and output optical data stream representing in-phase (I) and quadrature-phase (Q) components of the PM-QAM modulated signal. For example, optical hybrid mixer 48A outputs XI and XQ optical data streams. Optical hybrid mixer 48B outputs YI and YQ optical data streams. In some examples, optical hybrid mixers 48A and 48B may be 90 degree optical hybrid mixers. Also, in some examples, each one of the XI, XQ, YI, and YQ optical data streams may be differentially encoded data streams.

Photo-detectors 50A-50D receive respective optical signals of the XI, XQ, YI, and YQ optical data streams and convert these optical signals into electrical signals (e.g., the XI, XQ, YI, and YQ data streams that processor 24 receives). Photo-detectors 50A-50D may be composed of a single photo-diode or a pair of nominally balanced photo-diodes. A transimpedance amplifier (TIA) element for each photo-detector may used to convert photo-current from the photo-diode(s) to a voltage representation. However, the inclusion of TIA elements may not be necessary in every example. The electrical output of each photo-detector in 50A-50D can be single-ended or differential electrical signals.

In some examples, the TIA elements may include electrical amplifiers. There are two modes for the electrical amplifier: automatic gain control (AGC) and manual gain control (MGC). The AGC amplifiers may nominally maintain output electrical voltage amplitude/swing for varying input electrical current amplitude/swings by adjusting gains. This mode is mostly used when the coherent receiver is receiving the real time traffic. AGC mode acts to guarantee the electrical voltage amplitude/swing remains nearly constant when the input power to coherent receiver varies due to optical line system. However, during characterization/calibration, the MGC mode should be used. The reason is to keep the impact of the receiver front-end on the acquired signal as steady as possible. In AGC mode, the amplifier would adjust gains to make the voltage swing constant. Thus, the impact of the receiver front-end on the measurement may vary during acquisition, which is not desired. So controller 35 may switch the electrical amplifiers to MGC mode during the characterization/calibration, and then switch to AGC mode during the normal operation.

In this manner, the receive photonics of photonics 12 convert the PM-QAM modulated optical signal into electrical I and Q data stream pairs (e.g., the XI, XQ, YI, and YQ data streams) for further processing by processor 24 of host board 28. For example, processor 24 receives the XI, XQ, YI, and YQ electrical data stream pairs from photo-detectors 50A-50D through the mating between connection points 14 and connection points 22.

FIGS. 2A and 2B also illustrate controller 35 and optical switch 39. During normal operation (e.g., not in calibration mode), the output of PBC 40 flows through switch 39 and out through optical link 30 for downstream transmission. For upstream reception, the optical signal flows through switch 39 to PBS 42 during normal operation. During calibration, processor 24 may output a command to controller 35 to instruct controller 35 to configure optical switch 39 to divert the optical output of PBC 40 to the optical input of PBS 42. Examples of controller 35 include, but are not limited to, a DSP, a general purpose microprocessor, an ASIC, an FPGA, a combination thereof, or other equivalent integrated or discrete logic circuitry.

In this configuration, optical switch 39 conveys a feedback optical signal that feeds back the optical output of pluggable optical module 10 to the optical input of pluggable optical module 10. The feedback signal is transmitted through optical-to-electrical conversion via PBS 42, optical hybrid mixers 48A and 48B, and photo-detectors 50A-50D, back through connection points 14 and connection points 22 and ultimately to processor 24 for determination of the pre-compensation parameters for the TX-pre-compensation unit.

Figure 3A:
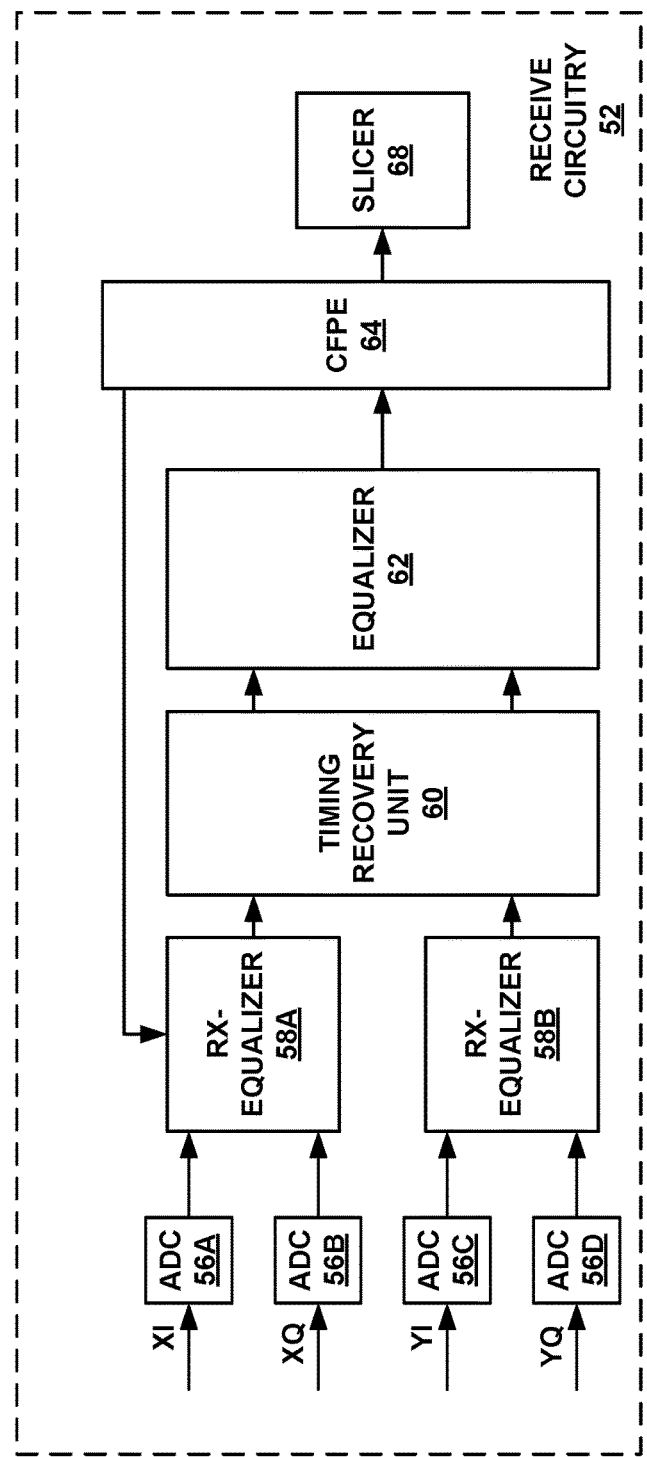
FIGS. 3A and 3B are block diagrams illustrating an example of THE processor of FIG. 1 in further detail.
Figure 3B:
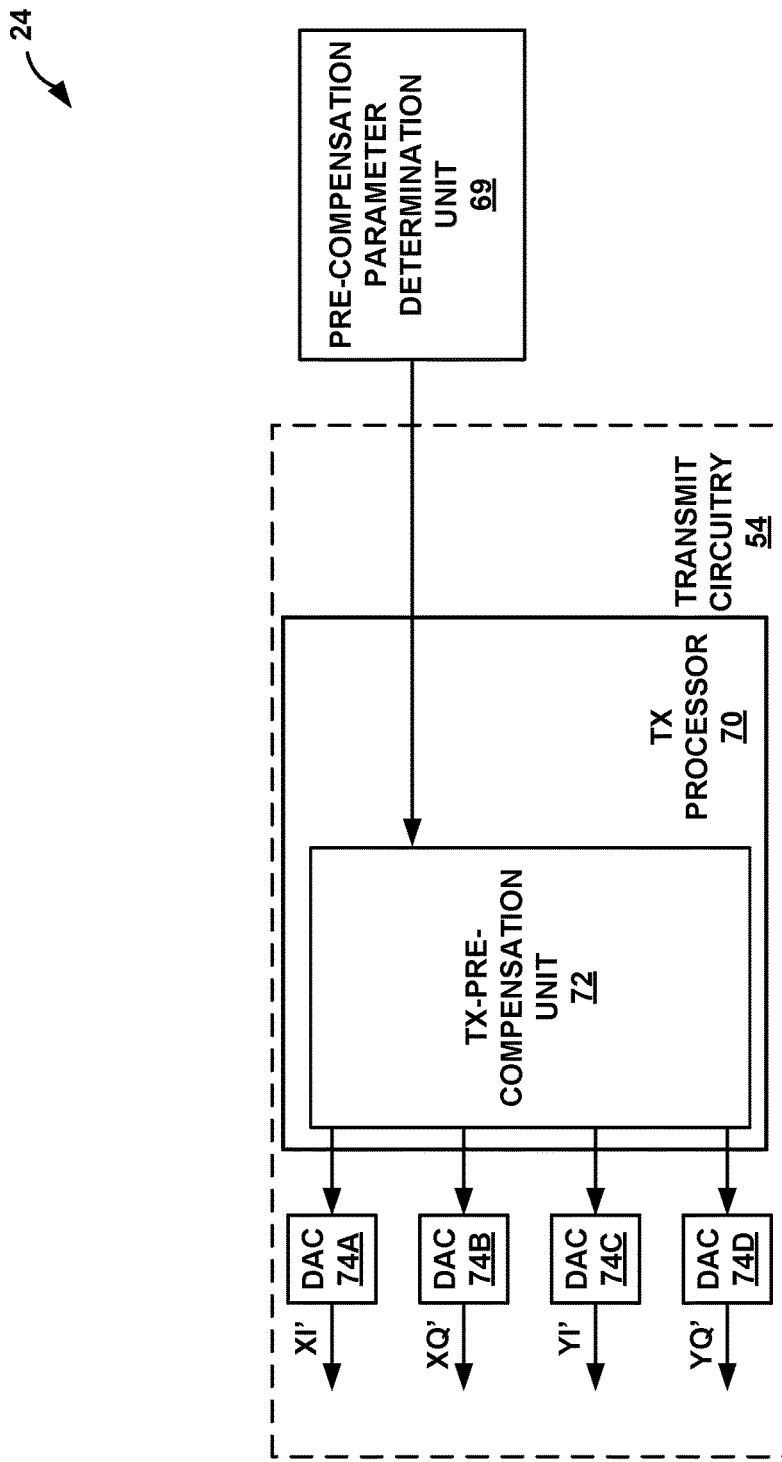

FIGS. 3A and 3B are block diagrams illustrating an example of processor 24 of FIG. 1 in further detail. In general, FIGS. 3A and 3B illustrate a set of exemplary functional blocks implemented by processor 24. Processor 24 may be a digital signal processor (DSP), an ASIC having specialized operations, a general purpose processor or similar execution unit or integrated circuit or electronic system capable of implementing the operations described herein. For example, the components of processor 24 illustrated in FIGS. 3A and 3B may comprise instructions executable from a memory, microcode, hardware-based logic functions or combinations thereof. In general, based on the described operations, processor 24 may be referred to as a modulator-demodulator (modem). For ease of description, FIGS. 3A and 3B are described together.

In the illustrated examples of FIGS. 3A and 3B, processor 24 includes receive circuitry 52 and transmit circuitry 54. For example, receive circuitry 52 includes electronic components for reception of the electrical signal across connection points 14 and connection points 22 from photonics 12, and transmit circuitry 54 includes electric components for transmission of the electrical signal across connection points 22 and connection points 14 to photonics 12.

Processor 24 also includes pre-compensation determination unit 69. Pre-compensation determination unit 69 may be hardware of processor 24 or software or firmware executing on processor 24. Pre-compensation determination unit 69 may be configured to determine the pre-compensation parameters in accordance with one or more example techniques described in this disclosure. For instance, pre-compensation determination unit 69 may be configured with information indicating the first digital signal that TX processor 70 of transmit circuitry 54 outputted during the calibration, and receives the second digital signal from receive circuitry 52 (e.g., the second digital signal corresponding to the second electrical signal generated from an optical-to-electrical conversion of a feedback optical signal that is generated from an electrical-to-optical conversion of the first electrical signal corresponding to the first digital signal by pluggable optical module 10). Pre-compensation determination unit 69 may determine a transfer function, and based on the transfer function, determine the pre-compensation parameters that compensate for the signal integrity degradation represented by the transfer function.

Receive circuitry 52 depicted in FIG. 3A includes analog-to-digital converters (ADCs) 56A-56D, receiver (RX)-equalizers 58A and 58B, timing recovery unit 60, equalizer 62, carrier frequency and phase estimation (CFPE) unit 64, and slicer 68. The output of slicer 68 may be a relatively high data rate digital data stream. Components such as a training deframer may receive the output of slicer 68. A forward-error correction (FEC) decoder, if FEC is utilized, may receive the output of the training deframer and may decode the electrical data stream for further transmission downstream (e.g., to the one or more switches and routers after deserialization). The training deframer and FEC decoder may be part of processor 24, or external to processor 24 and are not illustrated for purposes of clarity.

ADCs 56A-56D are input units of processor 24 that receive data streams via pluggable interface 13 and pluggable interface 21. For example, each of ADCs 56A-56D receive one of the analog XI, XQ, YI, and YQ electrical data streams from pluggable optical module 10 via pluggable interface 13 and pluggable interface 21, and convert the analog data streams into digital data streams. ADCs 56A-56D may be external to processor 24 in some examples, but are described as being internal to processor 24 in this example. As described in more detail below, transmit circuitry 54 outputs a first electrical signal generated from a first digital signal to pluggable optical module 10. ADCs 56A-56D receive a second electrical signal from optical pluggable module 10. In this example, the second electrical signal is generated from an optical-to-electrical conversion of a feedback optical signal that is generated from an electrical-to-optical conversion of the first electrical signal received by pluggable optical module 10. ADCs 56A-56D convert the second electrical signal into a second digital signal, where the first digital signal and the second digital signal are different due to signal integrity degradation along a signal path of the first digital signal through pluggable optical module 10.

RX-equalizer 58A receives one pair of the I/Q digitized data streams (i.e., XI and XQ data streams), and RX-equalizer 58B receives another pair of the I/Q data streams (i.e., YI and YQ data streams). RX-equalizer 58A and RX-equalizer 58B can be considered as filters that can compensate for receiver front-end imperfections and certain optical distortions on the pairs of the I/Q digitized data streams. Receiver front-end imperfections may include impairments such as I/Q gain imbalances, I/Q non-orthogonality, I/Q offset, etc. A common example of optical distortion tackled by RX-equalizer 58A and RX-equalizer 58B may be chromatic dispersion.

In some examples, RX-equalizer 58A and RX-equalizer 58B may be formed in single 2×2 complex multiple-input-multiple-output (MIMO) equalizer, such as the equalizer 62 in receive circuitry 52. This 2×2 complex RX-equalizer may compensate for the distortion on at least two pair of the received data streams simultaneously. In some instances, such a common RX-equalizer may be a relatively large equalizer that consumes most of the real estate available on processor 24, as compared to two 1×1 complex equalizers (i.e., RX-equalizer 58A and RX-equalizer 58B). For real estate management, processor 24 may include RX-equalizer 58A and RX-equalizer 58B, in addition to a smaller 2×2 complex equalizer 62, as illustrated in FIG. 3A.

Timing recovery unit 60 receives data streams from RX-equalizer 58A and RX-equalizer 58B and performs timing recovery. For example, timing recovery unit 30 performs symbol timing utilizing interpolation and Timing Error Detector (TED) to achieve symbol timing recovery, although other timing recovery techniques are possible. One example of the timing recovery technique is described in F. M. Gardner, "BPSK/QPSK Timing-Error Detector for Sampled Receivers," IEEE Transactions on Communications, vol. COM-34, No. 5, May 1986, and is incorporated by reference in its entirety. The sampling frequency locked clock, generated by timing recovery unit 60, may provide the clock signal for components of processor 24 or for other components on host board 28.

Equalizer 62 receives the data streams from timing recovery unit 60 and performs any other compensations. For example, RX-equalizer 58A and RX-equalizer 58B may not be able to compensate for all of the chromatic dispersion, and equalizer 62 may compensate for any remaining chromatic dispersion. In addition, equalizer 62 may un-mix the polarization of the received data streams. For example, equalizer 62 may compensate for any polarization mixing in optical link 30 (e.g., mixing between the lightwave with polarization X and the lightwave with polarization Y). Furthermore, equalizer 62 may perform some compensation for the distortion induced by pluggable interface 13 and pluggable interface 21.

Carrier frequency and phase estimation unit (CFPE) 64 corrects for the phase and the frequency offset present in the data stream. For example, as described above with respect to FIG. 2B, local oscillator 44 may be a free-running oscillator. Because local oscillator 44 may be a free-running oscillator, the XI and XQ data streams may be orthogonal to one another, and the YI and YQ data streams may be orthogonal to one another; however, the phases of each of these data streams may not be fixed and there may exist a frequency offset between the carrier frequency of the received lightwave and that of the local oscillator. CFPE 64 may function in feedback or feed-forward modes to estimate and compensate for the frequency and phase offsets of the received data streams. Slicer 68 receives the data streams from CFPE 64. It may convert the estimated constellation symbols at the output of CFPE 64 to binary sequences or pass the symbol estimates as I/Q pairs depending on the implementation for further processing within processor 24 or other components on host board 28.

Pre-compensation parameter determination unit 69 receives the digital signal from one (or may be more) components of receive circuitry 54. Although pre-compensation parameter determination unit 69 is not illustrated in FIG. 3A, pre-compensation parameter determination unit 69 is part of the same processor 24 as receive circuitry.

As illustrated in FIG. 3B, transmit circuitry 54 includes transmitter (TX) processor 70 (e.g., TX digital signal processing (DSP)), and digital-to-analog converters (DACs) 74A-74D. DACs 74A-74D receive digital pairs of dXI', dXQ', dYI', and dYQ' data streams from TX processor 70 and convert the digital data streams into analog data streams for transmission to pluggable optical module 10. In FIG. 3B, DACs 74A-74D are output units of processor 24 that transmit data streams to photonics 12 via pluggable interface 21 and pluggable interface 13. TX processor 70 may receive a forward-error correction (FEC) encoded data stream, which might have framing applied to it prior to FEC, from other components within processor 24 or other components on host board 28. TX processor 70 may perform its own training symbol insertion, map the received encoded data stream to the symbols for the desired modulation, and apply spectral shaping and various other electrical and/or optical pre-compensation functions, where the latter optical pre-compensation, in general, refers to pre-compensation of optical linear/non-linear impairments that may be present in network 32. For example, TX processor 70 may convert the encoded data stream to the symbols for PM-QAM modulation with desired spectral properties to generate the pairs of I' and Q' data streams.

One of the functional blocks within TX processor 70 is TX-pre-compensation unit 72. Similar to RX-equalizer 58A and RX-equalizer 58B, TX-pre-compensation unit 72 may operate on pairs of data streams and may implement an adaptive, fixed, or configurable filter. However, the filter that TX-pre-compensation unit 72 implements pre-compensates for distortions that the signal may experience while traversing the signal path extending from the chip die of processor 24 through the interconnection points 14, 22 and to the output of the pluggable optical module 10. TX-pre-compensation unit 72 can be implemented as an independent filter or it may be combined with other filters within TX processor 70. For example, TX-pre-compensation unit 72 can be combined with a spectral shaping filter. As an independent block, TX-pre-compensation unit 72 can be placed in various positions within TX processor 70 including after symbol mapping function in TX processor 70.

In the techniques described in this disclosure, TX-pre-compensation unit 72 compensates the distortion added by DACs 74A-74D, interconnections of processor 24 to the host board 28, traces 23, interfaces 21, 13, traces 25, and photonics 12 (e.g., distortions from DACs 74A-74D to the output of pluggable optical module 10). Since photonics 12 includes "opto-electrical" components, the distortions that TX-pre-compensation unit 72 targets to compensate for are not electrical only but include "optical impairments," as well.

In some examples, processing circuitry such as pre-compensation parameter determination unit 69 is configured to determine the pre-compensation parameters for TX-pre-compensation unit 72. For example, pre-compensation parameter determination unit 69 may be pre-configured or may load from cache memory or system memory information indicating the first electrical signal that processor 24 outputs for calibration (e.g., the XI', XQ', YI', and YQ' data streams). Pre-compensation parameter determination unit 69 receives a second electrical signal from receive circuitry 52 (e.g., the XI, XQ, YI, and YQ data streams). In this example, the second electrical signal is the optical-to-electrical conversion of the feedback signal which is the electrical-to-optical conversion of the first electrical signal fed back into pluggable optical module 10.

Pre-compensation parameter determination unit 69 may be configured to extract an empirical transfer function estimate (ETFE). More precisely, the signals that pre-compensation parameter determination unit 69 operates on are the digital signals corresponding to the first and the second electrical signals that can be represented in the time-domain as x(n) for the first electrical signal and y(n) for the second electrical signal. The relationship in the time-domain between x(n) and y(n) can be represented as:

$$y(n)=\Sigma_m x(m)g(n-m) \quad \text{(eq. 1)}.$$

In equation 1, g(n) is the time-domain transfer function, commonly referred to as the impulse response, representing the impact of the signal path on the signal x(n). In the frequency domain, through an N-point discrete Fourier transform (DFT), equation 1 can be rewritten as:

$$Y_N(w) = (X_N(w))(G_N(e^{jw}))  \quad\quad (eq. 2).$$

In equation 2, $Y_N(w)$ and $X_N(w)$ are the frequency domain representations of y(n) and x(n), respectively. Solving for $G_N(e^{jw})$ from equation 2 results in $G_N(e^{jw}) = Y_N(w)/X_N(w)$. The function $G_N(e^{jw})$ is referred to as the empirical channel transfer function estimate (e.g., frequency-domain transfer function representing the characteristics of the signal path).

With noise process v(n) included, $G_N(e^{jw})$ can be written as follows:

$$G_N(e^{jw}) = G_0(e^{jw}) + (R_N(w)/X_N(w)) + (V_N(w)/X_N(w)) \quad (eq. 3).$$

In equation 3, $G_0(e^{jw})$ denotes the desired transfer function estimate and $R_N(e^{jw})$ signifies residual terms in spectral estimation. The $R_N(e^{jw})$ and $V_N(e^{jw})$ terms equal zero if the first digital signal is a periodic signal (e.g., 1010101010 . . . , 110011001100 . . . , and so forth, or pseudo-random binary sequence, or a sinusoidal sequence comprised of a single frequency tone or a multitude of frequency tones, or any other periodic signal of choice). Therefore, if the first digital signal is a periodic signal, then $G_0(e^{jw})$ would more closely represent $G_N(e^{jw})$, eliminating secondary noise sources inherent in spectral estimation process.

Based on the above equations, in some examples, pre-compensation parameter determination unit 69 may convert the first digital signal in the time-domain and the second digital signal in the time-domain into respective signals in the frequency-domain (e.g., convert x(n) and y(n) to X(w) and Y(w) via a DFT). Pre-compensation parameter determination unit 69 may determine a ratio between the respective signals in the frequency-domain (e.g., Y(w)/X(w)) to estimate the frequency-domain transfer function. As another example, pre-compensation parameter determination unit 69 may utilize a search algorithm to try different equations for G(w) until pre-compensation parameter determination unit 69 identifies an equation for G(w) where X(w) multiplied by G(w) equals or closely resembles Y(w) or, in the time-domain, where x(n) convolved with g(n) equals or closely resembles y(n). There may be other ways to determine the transfer function and the techniques are not limited to any specific example.

In the above example for G(w), the second digital signal is generated from the optical-to-electrical conversion of the electrical-to-optical conversion of the first electrical signal corresponding to the first digital signal, where the second digital signal is processed through photo-detector 50A-50D, transimpedance amplifiers, and possibly other amplifiers and ADCs. Each of these components may have an effect in degrading the signal integrity. However, these components (e.g., the receiver side components) would not be present in the signal path during normal operation.

For instance, after pre-compensation parameter determination unit 69 determines the pre-compensation parameters of TX-pre-compensation unit 72, TX-pre-compensation unit 72 may apply pre-compensation based on the determined parameters during normal operation where pluggable optical module 10 outputs to network 32 via optical link 30, rather than feeding its output optical signal back to its receive path. However, the transfer function (G(w)) may have been determined based on the characteristics of the receive-side components (e.g., photo-detectors 50A-50D, transimpedance amplifiers, and the like).

In some cases, the characteristics of these receive-side components may be negligible (e.g., have very little impact on the signal integrity), and pre-compensation parameter determination unit 69 may take no further action to account for the impact on the signal integrity due to the receive-side components. In some cases, pluggable optical module 10 may include memory and a processor that stores information indicating the characteristics of the optical components on the receive side of pluggable optical module 10.

In such examples, during calibration, pluggable optical module 10 outputs to processor 24 information indicating the transfer function of the optical components on the receive side. This transfer function may also potentially include the loss from connection points 14. Pre-compensation parameter determination unit 69 may use this transfer function along with the information that it may have on the traces of the receive path connecting the module to the host board and on the receive-side components present on the host board 28 (e.g., ADC) to adjust the determined transfer function so that adjusted and final transfer function represents the signal integrity impact of only the transmit signal path, which is the signal path along which the output of processor 24 would travel during normal operation.

In the absence of full information on the receive path, the pre-compensation parameter determination unit 69 may only use the partial information it may have on the traces of the receive path connecting the module to the host board and on the receive-side components present on the host board 28 (e.g., ADC) to help improve transmit signal path transfer function estimation. In the case of having no information available on the receive path transfer function (which may be rare), the measured transfer function for the signal path (including the transmit path and the receive path) can be partitioned between transmit path and the receive path by applying weights, which might be constant or a function of frequency), determined by a linear, quadratic or some other function of proportionality of choice.

In the example illustrated in FIGS. 3A and 3B, processor 24 is a processor for a line card (e.g., host board 28) used in optical communication. Processor 24 includes transmit circuitry 54 configured to output a first electrical signal to pluggable optical module 10, and receive circuitry 52 configured to receive a second electrical signal from pluggable optical module 10. Pluggable optical module 10 may be removably coupled to the electronic device that houses processor 24 (e.g., the line-card that houses processor 24). As described, the second electrical signal is generated from an optical-to-electrical conversion of a feedback optical signal that, in turn, is generated from an electrical-to-optical conversion of the first electrical signal received by pluggable optical module 10, and the first electrical signal and the second electrical signal are different due to signal integrity degradation along a signal path of the first electrical signal through pluggable optical module 10.

Processor 24 also includes processing circuitry (e.g., pre-compensation parameter determination unit 69) configured to determine pre-compensation parameters based on the first electrical signal and the second electrical signal, and in some examples, based on the first digital signal corresponding to first electrical signal and the second digital signal corresponding to the second electrical signal. TX-pre-compensation unit 72 of processor 24 is configured to apply pre-compensation, based on the pre-compensation parameters, to a data signal to compensate for the signal integrity degradation along the signal path of the data signal.

During the calibration, processor 24 may cause TX-pre-compensation unit 72 to apply no equalization or apply a fixed, known level of equalization. In examples where TX-pre-compensation unit 72 applies a fixed, known level of equalization during calibration, processing circuitry such as pre-compensation parameter determination unit 69 may de-embed the equalization provided by TX-pre-compensation unit 72, so that the adjusted transfer function more accurately represents the characteristics of the signal path. After calibration and during normal mode, processor 24 may cause TX-pre-compensation unit 72 to apply equalization (e.g., pre-compensation) based on the determined pre-compensation parameters.

Figure 4A:
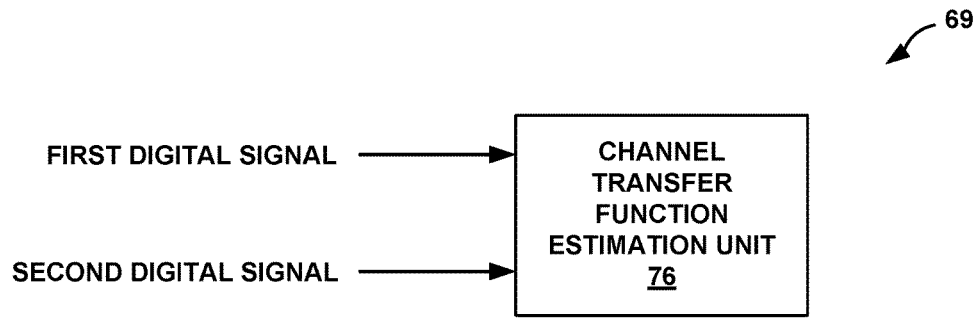
FIGS. 4A and 4B are conceptual diagrams illustrating the pre-compensation determination unit of FIG. 3B in further detail.
Figure 4B:
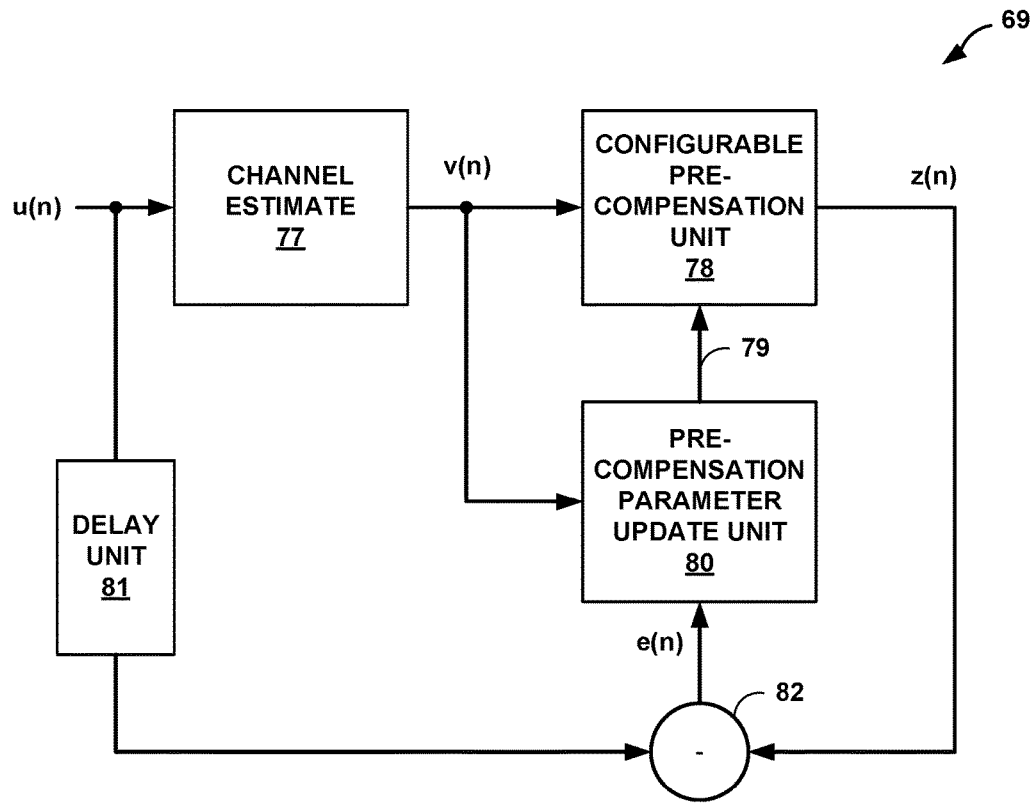

FIGS. 4A and 4B are conceptual diagrams illustrating pre-compensation determination unit 69 of FIG. 3B in further detail. The example in FIGS. 4A and 4B are conceptual examples used to assist in understanding the example techniques. The specific organization of the various components may be modified for different examples.

In the example illustrated in FIG. 4A, channel transfer function estimation unit 76 of pre-compensation parameter determination unit 69 is illustrated as receiving the first digital signal and the second digital signal. In this conceptual diagram, the first digital signal represents the signal that TX processor 70 is to output to DACs 74. Channel transfer function estimation unit 76 may not actually (although it is possible) receive the output from TX processor 70. Rather, channel transfer function estimation unit 76 may receive from internal memory or some other unit information of the periodic signal that TX processor 70 is to output during the calibration. This information of the periodic signal that TX processor 70 is to output that channel transfer function estimation unit 76 is to receive is referred to as the first digital signal (e.g., digital because prior to conversion to analog signal by DACs 74). The second digital signal is the digital signal generated by receive circuitry 52 (e.g., either from the output of receive circuitry 52 or via some component within receive circuitry 52).

Channel transfer function estimation unit 76 may determine the transfer function based on the first and second digital signals. For instance, channel transfer function estimation unit 76 may determine a ratio of the second digital signal to the first digital signal in the frequency domain (e.g., determine FFT, as merely one example, of first digital signal and second digital signal to convert to frequency domain and determine transfer function in frequency domain).

Once channel transfer function estimation unit 76 determines the transfer function, pre-compensation parameter determination unit 69 determines the parameters for TX-pre-compensation unit 72. FIG. 4B provides an example way in which to determine the compensation parameters for TX-pre-compensation unit 72. For instance, FIG. 4B conceptually illustrates an algorithm that pre-compensation parameter determination unit 69 may perform. As one example, pre-compensation parameter determination unit 69 may include software or firmware executing on processor 24 that performs the example algorithm illustrated in FIG. 4B or hardware components that perform the example algorithm illustrated in FIG. 4B.

Prior to describing the functionality of the example illustrated in FIG. 4B, the following provides some additional context for the digital signals used for determining the pre-compensation parameters to assist with understanding. During calibration phase, optical loopback is activated, and thus, the optical output signal leaving PBC 40 feeds back into PBS 42 through switch 39 within optical pluggable module 10. The optical path between the PBC 40 and PBS 42 may not be polarization maintaining in some cases, but may be polarization maintaining in other cases.

If the optical path is polarization maintaining, the transmitted first digital signal and the received second digital signal can be used directly by the transfer function determination process of channel transfer function estimation unit 76. If, however, the optical path does not maintain the transmit polarization state, then the polarization of the transmitted output optical signal can randomly change before reaching the input of the PBS 42. This optical phenomenon manifests itself as a polarization crosstalk and should be undone before or as part of the transfer function determination process by channel transfer function estimation unit 76. For example, in case of no polarization crosstalk, the respective signals in the first digital signal dXI', dXQ', dYI', and dYQ' and the second digital signal dXI, dXQ, dYI, and dYQ can be used for transfer function estimations directly by processing the ratios of the frequency responses of the respective signals in the second digital signal and the first digital signal. If polarization crosstalk is present, equalizer 62 may need to undo the polarization crosstalk before transfer function estimation process takes place at the channel transfer function estimation unit 76.

To undo polarization crosstalk, having only 1-tap is sufficient for equalizer 62. Indeed, using 1-tap equalizers in equalizer 62 has the benefit of that equalizer 62 does not alter the transfer function estimation process since equalizer 62 simply acts as an all-pass filter and does not impact the received signal's frequency response. Equalizer 62 would in this case simply convert the received digital data streams into second digital signal dXI, dXQ, dYI and dYQ that match the first digital signal dXI', dXQ', dYI', and dYQ' in polarization for transfer function estimation. In case a 1-tap equalizer cannot be employed, e.g., equalizer 62 needs to be employed with the same number of taps as it would be used during normal operation (e.g., 7 taps), then the taps of the adaptive equalizer 62 needs to be frozen (e.g., taps of equalizer 62 are prevented from being updated) while second digital signal is constructed from the received digital signal so that the effect of the transfer function of the equalizer 62 on the second digital signal feeding into the channel transfer function estimation unit 76 can be de-embedded while estimating the transfer function for the signal path at channel transfer function estimation unit 76.

For example, in some cases, pre-compensation determination unit 69 may receive the output from ADCs 56A-56D, and perform the example techniques described in this disclosure (e.g., where the outputs from ADCs 56A-56D are examples of the second digital signal). However, in some cases, the second digital signal may be pre-processed to generate a third digital signal, and pre-compensation determination unit 69 uses this third digital signal for determining the pre-compensation parameters.

Accordingly, although FIG. 4A illustrates channel transfer function estimation unit 76 receiving the first digital signal and the second digital signal, it should be understood that in some examples, channel transfer function estimation unit 76 receives the first digital signal and the third digital signal. However, because the third digital signal is generated from the second digital signal, in examples where the transfer function is determined from the first signal and the second signal or the first signal and the third signal, the techniques may be considered as determining pre-compensation parameters based on the first digital signal and the second digital signal (e.g., directly from the second digital signal or from a third digital signal, which is the second digital signal with some pre-processing).

In examples where the pre-processing is applied, which need not be in all cases, the pre-processing can be represented by its own transfer function, which indicates an amount of pre-processing performed on the second digital signal. Channel transfer function estimation unit 76 may de-embed the effects of the pre-processing (e.g., multiply a frequency domain representation of the third digital signal by the inverse of the transfer function for the pre-processing). Where pre-processing is applied, processor 24 may perform pre-processing to correct polarization crosstalk effects on the second digital signal (e.g., via equalizer 62) to generate a third digital signal to be used for channel transfer function estimation along with the first digital signal. In these examples, determining pre-compensation parameters includes determining the pre-compensation parameters based on the first and third digital signals and an amount of pre-processing performed on the second digital signal (e.g., to de-embed the pre-processing).

Pre-compensation determination unit 69 includes channel (i.e., signal path) estimate 77, configurable pre-compensation unit 78, pre-compensation parameter update unit 80, delay unit 81, and subtracter 82. Channel transfer function estimation unit 76 is depicted in FIG. 4A and it is used to determine the transfer function G(w) based on first digital signal and second digital signal as described above. For example, channel transfer function estimation unit 76 receives the second digital signal and the first digital signal and determines the transfer function. Channel estimate 77 receives the transfer function determined by channel transfer function estimation unit 76 and functions as a representation of the signal path along which the digital signal generated by TX processor 70 would travel (e.g., channel estimate 77 is based on the determined transfer function).

In FIG. 4B, three signals are identified: an input signal u(n), an intermediary signal v(n) and an output signal z(n). The input signal u(n) can be set to the first digital signal that was used as the excitation signal by processor 24 during channel transfer function estimation process by channel transfer function estimation unit 76 or to any other signal of interest (e.g., may not be a periodic signal and may be a signal more representative of actual data signal).

The intermediary signal v(n) represents the distorted signal after the input signal u(n) passes through the channel estimate 77 which applies the channel transfer function estimated above by channel transfer function estimation unit 76 on the input signal u(n). The intermediary signal v(n) feeds into both configurable pre-compensation unit 78 and to pre-compensation parameter update unit 80. Configurable pre-compensation unit 78 has the same characteristics as TX-pre-compensation unit 72 (e.g., the same number of taps, the same tap spacing in unit intervals, etc.) in processor 24. Furthermore, configurable pre-compensation unit 78 can be configured based on the updates it receives from pre-compensation parameter update unit 80. Configurable pre-compensation unit 78 applies its current transfer function based on its current parameter settings to the incoming signal v(n) to generate the output signal z(n). Pre-compensation parameter update unit 80 takes as inputs the intermediary signal v(n), the output signal z(n), and the difference between the delayed version of the input signal u(n), as outputted by delay unit 81, and the output signal z(n). Pre-compensation parameter update unit 80 applies a parameter update algorithm to determine the next TX-pre-compensation parameters based on some cost function (although other techniques are possible). The delay to be applied to the input signal u(n) by delay unit 81 before subtracter 82 can be set to the group delay of the channel transfer function estimated above.

In this way, configurable pre-compensation unit 78 may be a functional block (e.g., as hardware or software) that emulates the functionality of TX-pre-compensation unit 72. For instance, configurable pre-compensation unit 78 outputs an electrical signal that is substantially similar to the electrical signal that TX-pre-compensation unit 72 would have outputted had TX-pre-compensation unit 72 been configured according to the parameters determined by pre-compensation parameter update unit 80.

The output of configurable pre-compensation unit 78 (e.g., z(n)) is fed into subtracter 82, which subtracts z(n) from delayed u(n) to result in an error signal (e.g., e(n)). Subtracter 82 may be formed as an adder that adds u(n) to a negative of z(n).

Pre-compensation parameter update unit 80 receives the error signal and the intermediate signal v(n) and determines compensation parameter estimate 79. Configurable pre-compensation unit 78 applies compensation to v(n) and this process repeats until the cost function utilized within pre-compensation parameter update unit 80 is minimized.

In this example, pre-compensation parameter update unit 80 may determine compensation parameter estimate 79 based on the determined transfer function (e.g., as determined by channel transfer function estimation unit 76). Configurable pre-compensation unit 78 may apply compensation to the v(n) based on compensation parameters estimate 79 to generate a signal (e.g., z(n)). Subtracter 82 determines an error signal e(n) based on the signal z(n) and the delayed signal u(n). Pre-compensation parameter update unit 80 repeatedly updates compensation parameters estimate 79 until the cost function utilized within pre-compensation parameter update unit 80 is minimized. In this example, pre-compensation parameter determination unit 69 determines that the compensation parameter estimate 79 that minimized the cost function are the pre-compensation parameters that TX-pre-compensation unit 72 is to apply in normal operation. The compensation parameter estimate 79 that minimized the cost function may be the compensation parameter estimate 79 that minimizes energy in error signal (e(n)).

There may be various ways in which pre-compensation parameter update unit 80 determines the compensation parameters. One example method is the least mean squares (LMS) algorithm. For this algorithm, assume that $z(n)=(w^H(n))(v(n))$. In this example, $w^H(n)$ represent the compensation parameters estimate 79 (e.g., filter taps). The error signal $e(n)=z(n)-u(n)$, and pre-compensation parameter update unit 80 may implement the following equation to determine an update to compensation parameter estimate 79:

$$w(n+1)=w(n)+\mu v(n)e^*(n),$$

where $\mu$ represents the step size in determining the filter taps.

Accordingly, in some examples, to determine the pre-compensation parameters based on the determined transfer function, pre-compensation parameter determination unit 69 may apply the determined transfer function, as determined by channel transfer estimation unit 76, via channel estimate 77 to a first signal (e.g., u(n)) to generate a second signal (e.g., v(n)). Configurable pre-compensation unit 78 may compensate the second signal based on compensation parameters estimate 79 for effects caused by the transfer function on the first signal to generate a third signal (e.g., z(n)). For example, configurable pre-compensation unit 78 may process the second signal based on compensation parameters estimate 79 to compensate for effects caused by the transfer function on the first signal while generating the second signal and generating a third signal as a result of processing on the second signal.

Subtracter 82 may determine an error signal (e.g., e(n)) based on the first signal (u(n) or delayed u(n)) and the third signal (z(n)). Pre-compensation parameter determination unit 69 may repeatedly update compensation parameter estimate 79 until the cost function utilized within pre-compensation parameter update unit 80 is minimized. For instance, pre-compensation parameter determination unit 69 may repeatedly update compensation parameter estimate 79 to minimize energy in error signal (e(n)). In this example, compensation parameters estimate 79 that minimizes the cost function may be the compensation parameters that pre-compensation parameter determination unit 69 applies to TX-pre-compensation unit 72.

Figure 5:
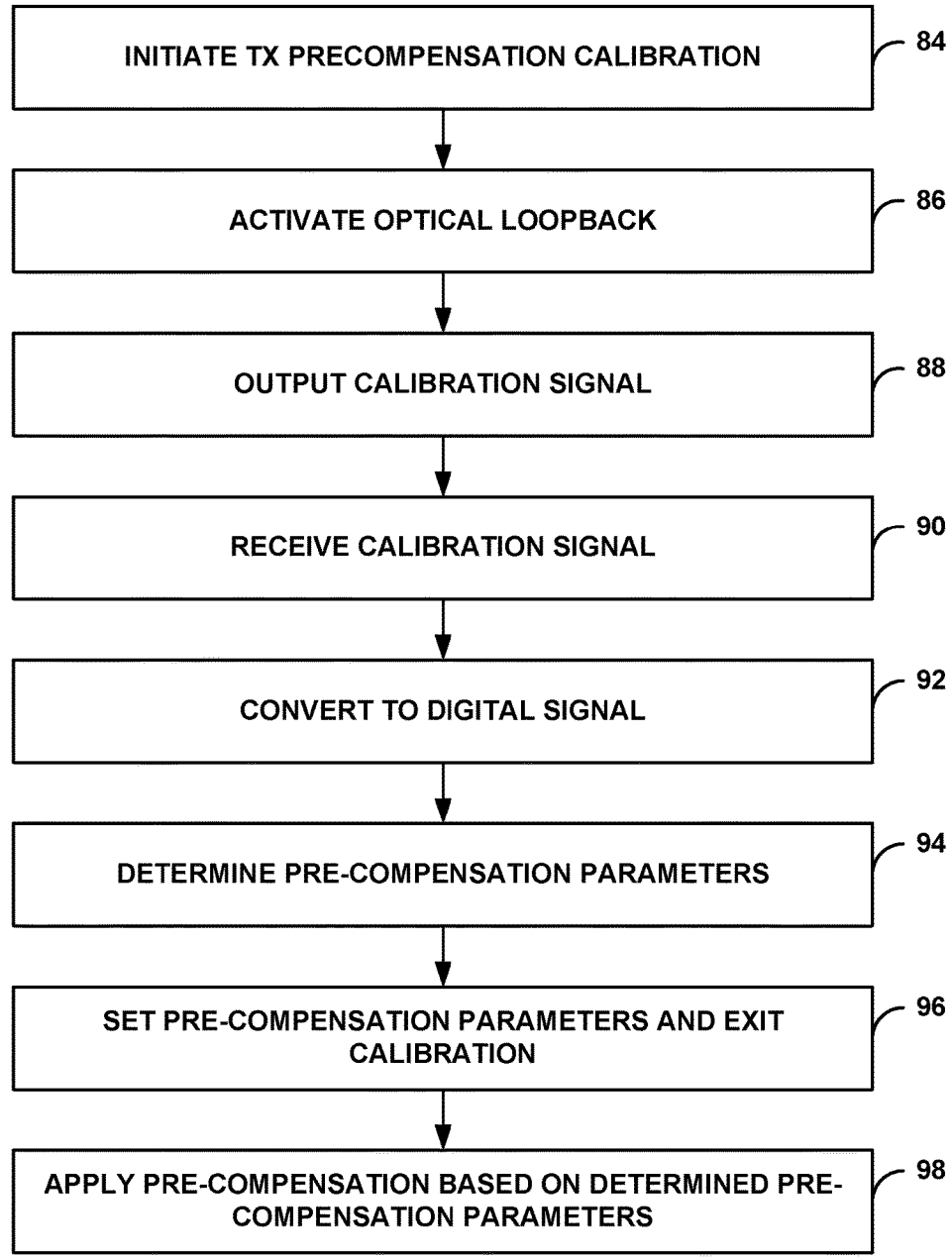
FIG. 5 is a flowchart illustrating an example technique in accordance with one or more aspects of this disclosure.

FIG. 5 is a flowchart illustrating an example technique in accordance with one or more aspects of this disclosure. For example, the technique illustrated in FIG. 5 may be applicable to host board 28 and to processor 24. For purposes of illustration only, reference is made to FIGS. 1, 3A, and 3B.

Processor 24 may detect that a pluggable module was just inserted onto host 28 (e.g., a line card) that houses processor 24 and initiate calibration (e.g., initiate calibration of pre-compensation parameters for TX-pre-compensation unit 72) (84). However, processor 24 may initiate calibration for other reasons as well. For example, processor 24 may initiate calibration in response to a calibration request or after a preset interval.

In some examples, rather than being pluggable, an optical module similar to pluggable optical module 10 may be hardwired to host board 28 that includes processor 24 (e.g., the components of such an optical module are hardwired to host board 28). The techniques described in this disclosure are applicable to examples where the optical module is hardwired. In such examples, processor 24 may initiate calibration in response to a calibration request or after a preset interval.

Processor 24 activates an optical loopback whereby the output of pluggable optical module 10 is fed back as the input of pluggable optical module 10 (86). Processor 24 may output an instruction to controller 35 instructing controller 35 to cause switch 39 to route the optical output from PBC 40 to PBS 42.

Processor 24 outputs a calibration signal to pluggable optical module 10 (88). ADCs 56A-56D receive a calibration signal from pluggable optical module 10 (90) and covert the calibration signal into a digital signal (92). Pluggable optical module 10 may be removably coupled to host board 28 (e.g., the electronic device that house processor 24 such as a chassis that includes the line card that includes pluggable optical module 10 and processor 24).

For example, processor 24 outputs a first electrical signal generated from a first digital signal (e.g., transmit circuitry 54 outputs the first electrical signal from DACs 74A-74D, where DACs 74A-74D receive the first digital signal from TX processor 70 featuring TX-pre-compensation unit 72). The first electrical signal may be a test signal (e.g., a periodic test signal, but do not have to be a periodic test signal).

The second electrical signal, which ADCs 56A-56D receive and convert to a second digital signal, is generated from an optical-to-electrical conversion of a feedback optical signal (e.g., through switch 39) that is generated from an electrical-to-optical conversion of the first electrical signal received by pluggable optical module 10. The first digital signal and the second digital signal are different due to signal integrity degradation along a signal path of the first digital signal through pluggable optical module 10.

Based on the first digital signal and the second digital signal, processor 24 determines pre-compensation parameters (94). For example, pre-compensation parameter determination unit 69 determines a transfer function (G(w)) based on the first digital signal and the second digital signal. The transfer function represents a ratio between the second digital signal and the first digital signal in frequency-domain (e.g., G(w)=Y(w)/X(w)). Pre-compensation parameter determination unit 69 determines the pre-compensation parameters based on the determined transfer function.

For example, pre-compensation parameter determination unit 69 may apply the determined transfer function via channel estimate 77 unit to first signal (e.g., u(n)) to generate a second signal (e.g., v(n)). Configurable pre-compensation unit 78 may compensate the second signal based on compensation parameter estimate 79 for effects caused by the transfer function on the first signal to generate a third signal (e.g., z(n)). For example, configurable pre-compensation unit 78 may process the second signal based on compensation parameters estimate 79 to compensate for effects caused by the transfer function on the first signal while generating the second signal and generating a third signal as a result of processing on the second signal.

Subtracter 82 may determine an error signal (e(n)) based on the first signal (u(n)) and the third signal (z(n)). Pre-compensation parameter update unit 80 may repeatedly update compensation parameter estimate 79 until the cost function utilized within pre-compensation parameter update unit 80 is minimized. For instance, pre-compensation parameter update unit 80 may repeatedly update compensation parameter estimate 79 to minimize energy in the error signal (e(n)). Pre-compensation parameter determination unit 69 determines that the compensation parameters estimate 79 that minimizes the cost function are the pre-compensation parameters that TX-pre-compensation unit 72 is to apply.

In some examples, the received electrical signal at the output of the ADCs at the receive-side may not be directly used for channel transfer function estimation in channel transfer function estimation unit 76. Processor 24 may need to perform some pre-processing on the second digital signal that ADCs 56A-56D output to generate third digital signal appropriate for transfer function estimation along with the first digital signal in channel transfer function estimation unit 76. As the third digital signal is generated from the second digital signal, the pre-compensation parameters are still based on the first digital signal and the second digital signal. The main pre-processing operation on the second digital signal takes place in equalizer 62 which un-does the polarization crosstalk that may take place while the optical output signal of pluggable optical module 10 feeds back into the optical input of pluggable optical module 10. In some cases, equalizer 62 may not only undo polarization crosstalk but also may apply its own transfer function to equalize for signal distortions. This may be undesired as it impacts the channel transfer function estimation process. In such examples, the transfer function applied on the received digital signal to generate the second digital signal may be de-embedded either within or before the channel transfer function estimation unit 76 to obtain a more accurate representation of the channel transfer function. Once an accurate representation of the channel transfer function is obtained, processor 24 initiates pre-compensation parameter determination unit 69 by feeding the determined channel transfer function into the channel estimate 77.

Accordingly, in some examples, equalizer 62 performs pre-processing to correct polarization crosstalk effects on the second digital signal to generate a third digital signal to be used for channel transfer function estimation along with the first digital signal. In such examples, pre-compensation parameter determination unit 69 determines the pre-compensation parameters based on the first and third digital signals and an amount of pre-processing performed on the second digital signal. For instance, the amount of pre-processing indicates how much to de-embed from the transfer function.

Pre-compensation parameter determination unit 69 sets the pre-compensation parameters of TX-pre-compensation unit 72 and exits the calibration (96). Processor 24, with TX-pre-compensation unit 72, applies pre-compensation, based on the pre-compensation parameters, to a data signal (e.g., in normal mode) to compensate for the signal integrity degradation along the signal path of the data signal (98). For instance, after processor 24 calibrates TX-pre-compensation unit 72, processor 24 may be able to switch from calibration mode to normal mode in which processor 24 outputs data to network 32. In some examples, processor 24 may periodically or after insertion of a new pluggable optical module can re-initiate calibration.

As an example, during calibration, processor 24 may instruct pluggable optical module 10 (e.g., controller 35 of pluggable optical module 10) to connect an optical output of pluggable optical module 10 (e.g., output of PBC 40) to an optical input of pluggable optical module 10 (e.g., PBS 42). Processor 24 outputs the first electrical signal generated from the first digital signal, receives the second electrical signal and converts second electrical signal to second digital signal, and determines the pre-compensation parameters after pluggable optical module 10 connects the optical output to the optical input. After calibration, processor 24 instructs pluggable optical module 10 to disconnect the optical output (e.g., PBC 40) from the optical input (e.g., PBS 42) and connect the optical output to an output of pluggable optical module 10 (e.g., to output to network 32 via optical link 30). Processor 24 applies pre-compensation with TX-pre-compensation unit 72 after pluggable optical module 10 connects the optical output to the output of pluggable optical module 10.

Figure 6A:
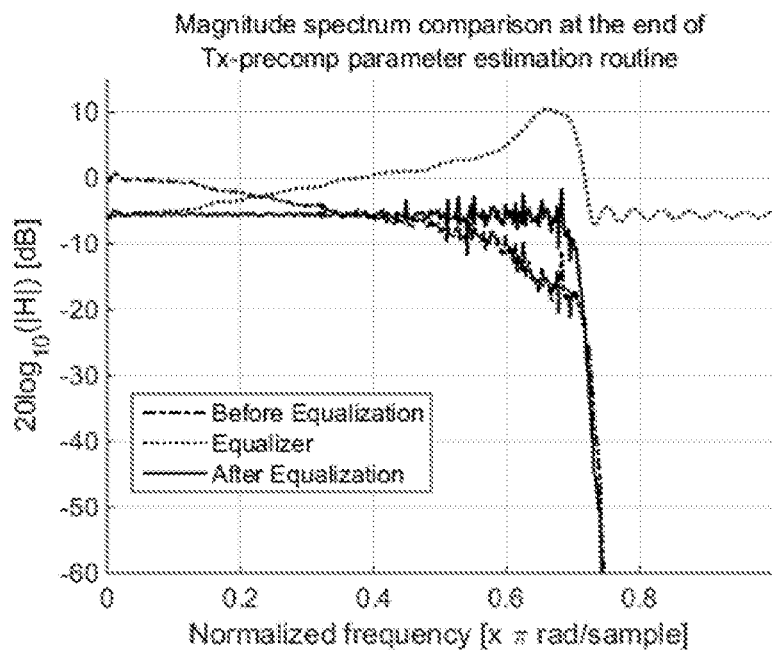
FIGS. 6A and 6B are graphs illustrating example results of the techniques described in this disclosure.
Figure 6B:
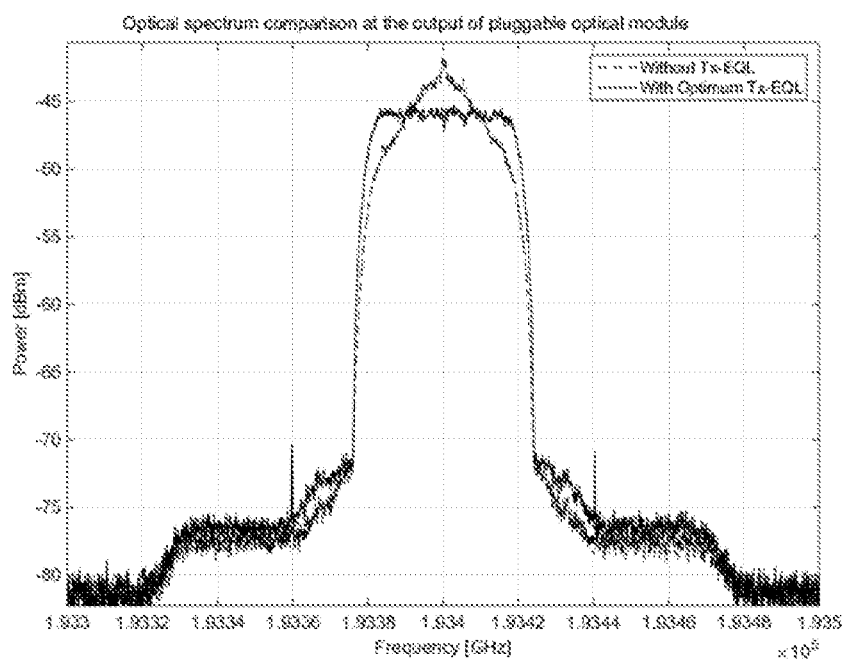

FIGS. 6A and 6B are graphs illustrating example results of the techniques described in this disclosure. In FIG. 6A, after equalization is provided with the pre-compensation parameters, as described in this disclosure, the passband of the output signal is equalized. Similarly, in FIG. 6B, after equalization is provided with the pre-compensation parameters the frequency response of the optical output signal flattens out, instead of degrading as a function of increasing frequency.

The techniques of this disclosure may be implemented in a wide variety of devices or apparatuses, including linecards, routers, optical interfaces, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:

1. A method for optical communication, the method comprising:
    outputting, with a processor of an electronic device, a first electrical signal generated from a first digital signal to an optical module coupled to the electronic device;
    receiving, with one or more analog-to-digital converters (ADCs), a second electrical signal from the optical module, the second electrical signal generated, by the optical module, from an optical-to-electrical conversion of a feedback optical signal output by an optical output of the optical module and received by an optical input of the optical module, wherein the feedback optical signal is generated, by the optical module, from an electrical-to-optical conversion of the first electrical signal;
    converting, with the one or more ADCs, the second electrical signal into a second digital signal, wherein the first digital signal and the second digital signal are different due to signal integrity degradation along a signal path through the optical module;
    performing pre-processing to correct polarization crosstalk effects on the second digital signal to generate a third digital signal;
    determining, with the processor of the electronic device, pre-compensation parameters based on the first digital signal, the third digital signal, and an amount of pre-processing performed on the second digital signal; and
    applying, with the processor of the electronic device, pre-compensation, based on the pre-compensation parameters, to a data signal to compensate for the signal integrity degradation along the signal path.

2. The method of claim 1, wherein the optical module comprises one of:
    a pluggable optical module removably coupled to the electronic device; or
    an optical module hardwired with a host board that includes the processor.

3. The method of claim 1, wherein outputting the first electrical signal comprises outputting a test signal in response to a calibration request or after a preset interval.

4. The method of claim 1, wherein the optical module comprises a pluggable optical module removably coupled to the electronic device, and wherein outputting the first electrical signal comprises outputting a test signal during configuration and calibration after insertion of the pluggable optical module in a line card that houses the processor.

5. The method of claim 1, further comprising:
    determining a transfer function based on the first digital signal and at least one of the second digital signal or the third digital signal, the transfer function representing a ratio between at least one of the second digital signal or the third digital signal and the first digital signal in frequency-domain,
    wherein determining pre-compensation parameters comprises determining the pre-compensation parameters based on the determined transfer function.

6. The method of claim 5, wherein determining the pre-compensation parameters based on the determined transfer function comprises:
    applying the determined transfer function to a first signal to generate a second signal;
    processing the second signal based on a compensation parameters estimate to compensate for effects caused by the transfer function on the first signal while generating the second signal;
    generating a third signal from the processing of the second signal;
    determining an error signal based on the first signal and the third signal; and
    repeatedly updating the compensation parameters estimate to minimize energy in the error signal.

7. The method of claim 1, wherein the optical module comprises a pluggable optical module, the method further comprising:
    instructing the pluggable optical module to connect the optical output of the pluggable optical module to the optical input of the pluggable optical module, wherein outputting the first electrical signal, receiving the second electrical signal, and determining the pre-compensation parameters occurs after the pluggable optical module connects the optical output to the optical input; and instructing the pluggable optical module to disconnect the optical output from the optical input and connect the optical output to an output of the pluggable optical module, wherein applying pre-compensation comprises applying pre-compensation after the pluggable optical module connects the optical output to the output of the pluggable optical module.

8. A processor for a line card used in optical communication, the processor comprising:

transmit circuitry configured to output a first electrical signal generated from a first digital signal to an optical module;

receive circuitry configured to:
receive a second electrical signal from the optical module, the second electrical signal generated, by the optical module, from an optical-to-electrical conversion of a feedback optical signal output by an optical output of the optical module and received by an optical input of the optical module, wherein the feedback signal is generated, by the optical module, from an electrical-to-optical conversion of the first electrical signal, and
convert the second electrical signal into a second digital signal, wherein the first digital signal and the second digital signal are different due to signal integrity degradation along a signal path through the optical module;

an equalizer configured to perform pre-processing to correct polarization crosstalk effects on the second digital signal to generate a third digital signal;

processing circuitry configured to determine pre-compensation parameters based on the first digital signal, the third digital signal, and an amount of pre-processing performed on the second digital signal; and a transmit equalizer configured to apply pre-compensation, based on the pre-compensation parameters, to a data signal to compensate for the signal integrity degradation along the signal path.

9. The processor of claim 8, wherein the transmit circuitry is configured to output the first electrical signal as a test signal in response to a calibration request or after a preset interval.

10. The processor of claim 8, wherein the transmit circuitry is configured to output the first electrical signal as a test signal during configuration and calibration after insertion of the optical module in the line card that houses the processor.

11. The processor of claim 8, wherein the processing circuitry is configured to:

determine a transfer function based on the first digital signal and at least one of the second digital signal or the third digital signal, the transfer function representing a ratio between at least one of the second digital signal or the third digital signal and the first digital signal in frequency-domain, wherein to determine pre-compensation parameters, the processing circuitry is configured to determine the pre-compensation parameters based on the determined transfer function.

12. The processor of claim 11, wherein to determine the pre-compensation parameters based on the determined transfer function, the processing circuitry is configured to:

apply the determined transfer function to a first signal to generate a second signal;

process the second signal based on a compensation parameters estimate to compensate for effects caused by the transfer function on the first signal while generating the second signal;

generate a third signal from the processing of the second signal;

determine an error signal based on the first signal and the third signal; and repeatedly update the compensation parameters estimate to minimize energy in the error signal.

13. An electronic device for optical communication, the electronic device comprising:

a pluggable interface for a pluggable optical module, wherein the pluggable interface is configured to removably couple the pluggable optical module to the electronic device;

a processor configured to output a first electrical signal generated from a first digital signal to the pluggable optical module through the pluggable interface; and one or more analog-to-digital converters (ADCs) configured to:
receive a second electrical signal from the pluggable optical module, the second electrical signal generated, by the optical module, from an optical-to-electrical conversion of a feedback optical signal output by an optical output of the optical module and received by an optical input of the optical module, wherein the feedback optical signal is generated, by the optical module, from an electrical-to-optical conversion of the first electrical signal; and
convert the second electrical signal into a second digital signal, wherein the first digital signal and the second digital signal are different due to signal integrity degradation along a signal path through the pluggable optical module, wherein the processor is further configured to:
perform pre-processing to correct polarization crosstalk effects on the second digital signal to generate a third digital signal;
determine pre-compensation parameters based on the first digital signal, the third digital signal, and an amount of pre-processing performed on the second digital signal; and
apply pre-compensation, based on the pre-compensation parameters, to a data signal to compensate for the signal integrity degradation along the signal path.

14. The electronic device of claim 13, wherein the processor is configured to output the first electrical signal as a test signal in response to a calibration request or after a preset interval.

15. The electronic device of claim 13, wherein the processor is configured to output the first electrical signal as a test signal during configuration and calibration after insertion of the pluggable optical module in a line card that houses the processor.

16. The electronic device of claim 13, wherein the processor is configured to determine a transfer function based on the first digital signal and at least one of the second digital signal or the third digital signal, the transfer function representing a ratio between at least one of the second digital signal or the third digital signal and the first digital signal in frequency-domain, wherein to determine pre-compensation parameters, the processor is configured to determine the pre-compensation parameters based on the determined transfer function.

17. The electronic device of claim 16, wherein to determine the pre-compensation parameters based on the determined transfer function, the processor is configured to:
apply the determined transfer function to a first signal to generate a second signal;
process the second signal based on a compensation parameters estimate to compensate for effects caused by the transfer function on the first signal while generating the second signal;
generate a third signal from the processing of the second signal;
determine an error signal based on the first signal and the third signal; and
repeatedly update the compensation parameters estimate to minimize energy in the error signal.

18. The electronic device of claim 13, wherein the electronic device comprises one of:
a line card; or
a chassis that includes the line card, and wherein the line card includes the pluggable interface and the processor.

19. The electronic device of claim 13, wherein the electronic device is coupled to the pluggable optical module.

20. A method for optical communication, the method comprising:
outputting, with a processor of an electronic device, a first electrical signal generated from a first digital signal to an optical module coupled to the electronic device;
receiving, with one or more analog-to-digital converters (ADCs), a second electrical signal from the optical module, the second electrical signal generated, by the optical module, from an optical-to-electrical conversion of a feedback optical signal output by an optical output of the optical module and received by an optical input of the optical module, wherein the feedback optical signal is generated, by the optical module, from an electrical-to-optical conversion of the first electrical signal;
converting, with the one or more ADCs, the second electrical signal into a second digital signal, wherein the first digital signal and the second digital signal are different due to signal integrity degradation along a signal path through the optical module;
determining a transfer function based on the first digital signal and the second digital signal, the transfer function representing a ratio between the second digital signal and the first digital signal in frequency-domain;
determining, with the processor of the electronic device, pre-compensation parameters based on the determined transfer function, wherein determining the pre-compensation parameters based on the determined transfer function comprises:
applying the determined transfer function to a first signal to generate a second signal;
processing the second signal based on a compensation parameters estimate to compensate for effects caused by the transfer function on the first signal while generating the second signal;
generating a third signal from the processing of the second signal;
determining an error signal based on the first signal and the third signal; and
repeatedly updating the compensation parameters estimate to minimize energy in the error signal; and
applying, with the processor of the electronic device, pre-compensation, based on the pre-compensation parameters, to a data signal to compensate for the signal integrity degradation along the signal path.

21. An electronic device for optical communication, the electronic device comprising:
a pluggable interface for a pluggable optical module, wherein the pluggable interface is configured to removably couple the pluggable optical module to the electronic device;
a processor configured to output a first electrical signal generated from a first digital signal to the pluggable optical module through the pluggable interface, and instruct the pluggable optical module to connect an optical output of the pluggable optical module to an optical input of the pluggable optical module; and
one or more analog-to-digital converters (ADCs) configured to:
receive, after the pluggable optical module connects the optical output to the optical input, a second electrical signal from the pluggable optical module, the second electrical signal generated, by the optical module, from an optical-to-electrical conversion of a feedback optical signal output by the optical output of the optical module and received by the optical input of the optical module, wherein the feedback optical signal is generated, by the optical module, from an electrical-to-optical conversion of the first electrical signal; and
convert the second electrical signal into a second digital signal, wherein the first digital signal and the second digital signal are different due to signal integrity degradation along a signal path through the pluggable optical module,
wherein the processor is further configured to:
determine, after the pluggable optical module connects the optical output to the optical input, pre-compensation parameters based on the first digital signal and the second digital signal;
instruct the pluggable optical module to disconnect the optical output from the optical input and connect the optical output to an output of the pluggable optical module; and
apply, after the pluggable optical module connected the optical output to the output of the pluggable optical module, pre-compensation, based on the pre-compensation parameters, to a data signal to compensate for the signal integrity degradation along the signal path.

* * * * *